United States Patent
He et al.

(10) Patent No.: US 10,462,439 B2
(45) Date of Patent: Oct. 29, 2019

(54) COLOR CORRECTION WITH A LOOKUP TABLE

(71) Applicant: Vid Scale, Inc., Wilmington, DE (US)

(72) Inventors: Yuwen He, San Diego, CA (US); Yan Ye, San Diego, CA (US); Louis Kerofsky, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 15/765,338

(22) PCT Filed: Oct. 3, 2016

(86) PCT No.: PCT/US2016/055143
§ 371 (c)(1),
(2) Date: Apr. 2, 2018

(87) PCT Pub. No.: WO2017/059415
PCT Pub. Date: Apr. 6, 2017

(65) Prior Publication Data
US 2018/0288381 A1    Oct. 4, 2018

Related U.S. Application Data

(60) Provisional application No. 62/236,665, filed on Oct. 2, 2015.

(51) Int. Cl.
*H04N 9/64*     (2006.01)
*H04N 11/24*    (2006.01)
(Continued)

(52) U.S. Cl.
CPC .......... *H04N 9/646* (2013.01); *H04N 1/6005* (2013.01); *H04N 7/0135* (2013.01); *H04N 9/77* (2013.01);
(Continued)

(58) Field of Classification Search
CPC ...... H04N 9/646; H04N 19/12; H04N 19/186; H04N 19/85; H04N 1/6005; H04N 7/0135; H04N 9/77; H04N 11/006
(Continued)

(56) References Cited

U.S. PATENT DOCUMENTS 5,510,850 A * 4/1996 Ueda .................. H04N 9/64
348/649
5,565,931 A * 10/1996 Girod ................. H04N 9/67
348/254
(Continued)

FOREIGN PATENT DOCUMENTS

CN      103959785 A      7/2014
WO    WO 2014/166705 A1   10/2014
WO    WO 2015/103124 A1    7/2015

OTHER PUBLICATIONS

Baroncini, Vittorio, "HDR CfE Subjective Evaluations at Rome", M36835, ISO/IEC JTC1/SC29/WG11 MPEG2015/M36835, Warsaw, Poland, Jul. 2015, 5 pages.
(Continued)

*Primary Examiner* — Michael Lee
(74) *Attorney, Agent, or Firm* — Condo Roccia Koptiw LLP

(57) ABSTRACT

Color correction in high dynamic range video (HDR) using 2D look-up table (LUT) may be provided. The color correction may be applied in a decoder after decoding the HDR video signal. For example, the color correction may be applied before, during, or after chroma upsampling of the HDR video signal. The 2D LUT may include a representation of the color space of the HDR video signal. The color correction may include applying triangle interpolation to the sample values of the color component of the color space. The 2D LUT may be estimated by an encoder and signaled
(Continued)

to the decoder. The encoder may decide to reuse a prior-signaled 2D LUT or use a new 2D LUT.

16 Claims, 16 Drawing Sheets

(51) Int. Cl.
    *H04N 1/60*         (2006.01)
    *H04N 19/85*       (2014.01)
    *H04N 19/12*       (2014.01)
    *H04N 19/186*     (2014.01)
    *H04N 7/01*         (2006.01)
    *H04N 9/77*         (2006.01)

(52) U.S. Cl.
    CPC ............. *H04N 11/28* (2019.01); *H04N 19/12* (2014.11); *H04N 19/186* (2014.11); *H04N 19/85* (2014.11)

(58) Field of Classification Search
    USPC ......................................................... 348/453
    See application file for complete search history.

(56) References Cited

U.S. PATENT DOCUMENTS

| | | | |
|---|---|---|---|
| 2009/0060362 A1* | 3/2009 | Harmanci | H04N 19/139 382/238 |
| 2012/0051636 A1* | 3/2012 | Greenebaum | H04N 9/67 382/167 |
| 2013/0107970 A1 | 5/2013 | Wang et al. | |
| 2016/0275658 A1* | 9/2016 | Klein | G06T 5/005 |
| 2016/0323556 A1* | 11/2016 | Luginbuhl | H04N 9/67 |
| 2017/0070735 A1* | 3/2017 | Ramasubramonian | H04N 19/124 |
| 2017/0105014 A1* | 4/2017 | Lee | H04N 19/30 |

OTHER PUBLICATIONS

Baroncini, Vittorio, "Results of HDR CfE Subjective Evaluations Conducted at Rome", ISO/IEC JTC1/SC29/WG11 MPEG2015/M36836, Warsaw, Poland, Jul. 2015, 10 pages.
Baylon et al., "Response to Call for Evidence for HDR and WCG Video Coding: Arris, Dolby and InterDigital", Arris Inc., Dolby Laboratories Inc. and Inter Digital Communications, LLC, ISO/IEC JTC1/SC29/WG 11 MPEG2015/M36264, Warsaw, Poland, Jun. 2015, 9 pages.
Bordes et al., "Color Gamut Scalable Video Coding for SHVC", IEEE, 2013 Picture Coding Symposium, Dec. 8, 2013, pp. 301-304.
Boyce et al., "Draft High Efficiency Video Coding (HEVC) Version 2, Combined Format Range Extensions (RExt), Scalability (SHVC), and Multi-View (MV-HEVC) Extensions", Document No. JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.
Cotton et al., "BBC's Response to CfE for HDR Video Coding (Category 3a)", British Broadcasting Corporation (BBC), ISO/IEC JTC1/SC29/WG11 M36249, Warsaw, Poland, Jun. 2015, 22 pages.
Dai et al., "An Efficient Dual-Stream Approach for HDR Video Coding (Cat. 1)", FastVDO LLC, ISO/IEC JTC1/SC29/WG11 MPEG2015/M36251, Warsaw, Poland, Jun. 2015, 27 pages.
Ebrahimi et al., "Description of Subjective Evaluation for Evidence (CfE) for HDR and WCG Video Coding", AHG on HDR and WCG, ISO/IEC JTC1/SC29/WG11 MPEG2014/M35481, Geneva, Switzerland, Feb. 2015, 3 pages.
EXR, "OpenEXR", Available on internet http://www.openxr.com/, retrieved on Oct. 9, 2017, 9 pages.
Ferwerda, James A., "Elements of Early Vision for Computer Graphics", IEEE Computer Graphics and Applications, vol. 21, No. 5, Oct. 2001, pp. 22-33.

Fogg, Chad, "Output Code Map SEI", Motion Picture Laboratories Inc., Document: JCTVC-T0102, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-4.
François et al., "Interim Report on The Anchors Generation in View of the Cfe for HDR/WCG Video Coding", ISO/IEC JTC1/SC29/WG11 MPEG2014/M35467, Geneva, Switzerland, Feb. 2015, 6 pages.
Goris et al., "Parameter Based Compatible HDR Proposal", Philips, ISO/IEC JTC1/SC29/WG11 MPEG2014/M35067, Strasbourg, France, Oct. 2014, 4 pages.
Goris et al., "Philips Response to CfE for HDR and WCG", Philips, ISO/IEC JTC1/SC29/WG11 MPEG2015/M36266, Warsaw, Poland, Jul. 2015, 16 pages.
Hanhart et al., "HDR CFE Subjective Evaluations at EPFL", M36168, Multimedia Signal Processing Group (MMSPG), Lausanne, Switzerland, Jun. 2015, pp. 1-10.
Hanhart et al., "Results of HDR CfE Subjective Evaluations Conducted at EPFL", Ecole Polytechnique Fédérale de Lausanne (EPFL), ISO/IEC JTC1/SC29/WG11 MPEG2015/m36728, Warsaw, Poland, Jul. 2015, 6 pages.
Hatchett et al., "GoHDR10+: A Category 1 HDR Video Compression Method", ISO/IEC JTC1/SC29/WG11 MPEG2014/M36261, Warsaw, Poland, Jun. 2015, 4 pages.
ISO/IEC, "Information Technology—Coding of Audio-Visual Objects—Part 2: Visual", ISO/IEC 14496-2, Dec. 1, 2001, 536 pages.
ISO/IEC, "Information Technology—Coding of Moving Pictures and Associated Audio for Digital Storage Media at Up to About 1,5 Mbit/s- Part 2: Video", ISO/IEC 11172-2:1993,Technical Corrigendum 3, Nov. 1, 2003, 6 pages.
ISO/IEC, "Information Technology—Generic Coding of Moving Pictures and Associated Audio Information: Video", ISO/IEC 13818-2, Dec. 15, 2000, 220 pages.
ITU, "Codec for Audiovisual Services At n × 384 kbit/s", H.261, Series H: Audiovisual and Multimedia Systems: Coding of Moving Video, Nov. 1988, 14 pages.
ITU-R, "Parameter Values for the HDTV Standards for Production and International Programme Exchange", ITU-R BT.709-6, Jun. 2015, 19 pages.
ITU-R, "Parameter Values for Ultra-High Definition Television Systems for Production and International Programme Exchange", ITU-R BT.2020, 2012, 8 pages.
ITU-R, "Reference Electro-Optical Transfer Function for Flat Panel Displays Used in HDTV Studio Production", Recommendation ITU-R BT.1886, BT Series, Broadcasting Service (Television), Mar. 2011, 7 pages.
ITU-T, "Advanced Video Coding for Generic Audiovisual Services", Series H: Audiovisual And Multimedia Systems: Infrastructure of Audiovisual Services—Coding of Moving Video, ITU-T Rec H.264 and ISO/IEC/MPEG 4 part 10, Nov. 2007, 563 pages.
ITU-T, "Video Coding for Low Bit Rate Communication", Transmission of Non-Telephone Signals, International Telecommunication Union, ITU-T Rec H.263, Mar. 1996, 52 pages.
Laksono, Indra, "Hardware Implementation of HDR Video Decoding and Display System", ViXS Systems, ISO/IEC JTC1/SC29/WG11 MPEG2015/M36162, Geneva, Switzerland, Feb. 2015, 6 pages.
Lasserre et al., "Technicolor's Response to CfE for HDRand WCG (Category 1)—Single Layer HDR Video Coding with SDR Backward Compatibility", Technicolor, ISO/IEC JTC1/SC29/WG11 MPEG2014/ M36263r1, Warsaw, Poland, Jun. 2015, 21 pages.
Léannec et al., "Modulation Channel Information SEI Message", Technicolor, Document: JCTVC-R0139r2, M33776, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-13.
Luthra et al., "Call for 1000 and 4000 nits Peak Brightness test material for HDR and WCG Video Coding", ISO/IEC JTC1/SC29/WG11 MPEG2014/N15099, Geneva, Switzerland, Feb. 2015, 2 pages.
Luthra et al., "Call for Evidence (CfE) for HDR and WCG Video Coding", ISO/IEC JTC1/SC29/WG11 MPEG2014/N15083, Geneva, Switzerland, Feb. 2015, 46 pages.

(56) References Cited

OTHER PUBLICATIONS

Luthra et al., "Requirements and Use Cases for HDR and WCG Content Coding", ISO/IEC JTC1/SC29/WG11 MPEG2014/N15084, Geneva, Switzerland, Feb. 2015, 13 pages.

Luthra et al., "Use Cases of the Scalable Enhancement of HEVC", WG11 Requirements and Video, ISO/IEC JTC1/SC29/WG11 N12955, Stockholm, Sweden, Jul. 2012, 8 pages.

Mantiuk et al., "HDR-VDP-2: A Calibrated Visual Metric for Visibility and Quality Predictions in All Luminance Conditions", ACM Transactions on Graphics (TOG)—Proceedings of ACM SIGGRAPH 2011, vol. 30, No. 4, Jul. 2011, 13 pages.

Rusanovskyy et al., "Single Layer Non-Normative (Category 3a) NCL and CL Responses to the Call for Evidence on HDR/WCG", Qualcomm Inc., Apple Inc, MovieLabs, NGCodec, ISO/IEC JTC1/SC29/WG11 M36256, Warsaw, Poland, Jun. 2015, 9 pages.

Sharma et al., "The CIEDE2000 Color-Difference Formula: Implementation Notes, Supplementary Test Data, and Mathematical Observations", Color Research & Applications (Wiley Interscience), vol. 30, No. 1, Feb. 2005, pp. 21-30.

Sheikh, Hamid Rahim, "Image Information and Visual Quality", IEEE Transactions on Image Processing, vol. 15, No. 2, Feb. 2006, pp. 430-444.

Smolic, Aljosa, "Informative Input on Temporally Coherent Local Tone Mapping of HDR Video", Disney Research Zurich, ISO/IEC JTC1/SC29/WG11 MPEG2014/M35479, Geneva, Switzerland, Feb. 2015, 1 page.

SMPTE, "High Dynamic Range Electro-Optical Transfer Function of Mastering Reference Displays", SMPTE ST 2084, Aug. 16, 2014, pp. 1-14.

SMPTE, "Mastering Display Color vol. Metadata Supporting High Luminance and Wide Color Gamut Images", SMPTE ST 2086, Oct. 13, 2014, pp. 1-6.

Stessen et al., "Chromaticity Based Color Signals", Philips, ISO/IEC JTC1/SC29/WG11 MPEG2014/M34335, Sapporo, Japan, Jul. 2014, 16 pages.

Strom et al., "Ericsson's Response to CfE for HDR and WCG", Ericsson, ISO/IEC JTC1/SC29/WG11 MPEG2014/m36184, Geneva, Switzerland, Feb. 2015, 11 pages.

Tourapis et al., "Exploration Experiment 3 on Objective Test Methods for HDR and WCG Video Coding Evaluation", ISO/IEC JTC1/SC29/WG11 MPEG2014/M35478, Geneva, Switzerland, Feb. 2015, 5 pages.

Tourapis et al., "HDRTools: Software Updates", Apple Inc., ISO/IEC JTC1/SC29/WG11 MPEG2014/M35471, MPEG HDR/WCG AHG Meeting, Lausanne, Switzerland, Dec. 2014, 2 pages.

* cited by examiner

COLOR CORRECTION WITH A LOOKUP TABLE

CROSS-REFERENCE TO RELATED APPLICATIONS

This application is the National Stage Entry under 35 U.S.C. § 371 of Patent Cooperation Treaty Application No. PCT/US2016/055143, filed Oct. 3, 2016, which claims the benefit of provisional U.S. patent application No. 62/236,665, filed Oct. 2, 2015, the disclosure of which is incorporated herein by reference in its entirety.

BACKGROUND

Demands for high-quality video contents such as high dynamic range (HDR) videos have been increasing. The higher quality has brought new challenges to video coding and decoding. For example, compared to standard dynamic range (SDR) video, high dynamic range (HDR) video content is characterized by, among other things, wider color gamut and broader luminance dynamic range that closely resemble the capabilities of human eyes. Chroma artifacts introduced in the video coding and/or decoding process, which may not be noticeable on SDR displays, may significantly distort presentation of the video on HDR displays (e.g., with peak luminance of 4000 candela (cd) per $m^2$ or "nits"). Systems, methods, and instrumentalities for correcting color distortions in high-quality videos (e.g., without significantly increasing the complexity of the video codecs) may therefore be desirable.

SUMMARY

Systems, methods and instrumentalities are described herein for processing video content. A coding device may receive (e.g., as output of a coding operation) a first luma sample and a first chroma sample, which may be misaligned (e.g., associated with two different sampling locations). The coding device may also receive a two-dimensional (2D) look-up table (LUT) for producing a corrected chroma value for the first chroma sample. The 2D LUT may define a luma dimension and a chroma dimension that are associated with a 2D color space of the video content. The coding device may determine an input luma value and an input chroma value to the 2D LUT based on the first luma sample and/or the first chroma sample (e.g., by aligning the first luma sample and the first chroma sample via interpolation). The coding device may produce an output chroma value, which may represent a corrected value for the first chroma sample, based on the 2D LUT, the input chroma value and the input luma value. The color correction (e.g., derivation of the corrected chroma values) may be performed during upsampling (e.g., from 4:2:0 chroma format to 4:4:4 chroma format). The coding device may reconstruct the video content using at least the output/corrected chroma value.

The 2D color space of the video content may be defined by a plurality of rectangular units with respective vertices. The plurality of rectangular units may be derived via quadtraee partitioning. The 2D LUT may comprise chroma component values associated with the respective vertices. In producing the output/corrected chroma value, the coding device may determine a first rectangular unit among the plurality of rectangular units to which the input luma value and the input chroma value may belong, and calculate the output/corrected chroma value via triangle interpolation based on a subset of the chroma component values associated with the vertices of the first rectangular unit, the input chroma value, and the input luma value. The coding device may further determine a first triangle inside the first rectangular unit to which the input luma value and the input chroma value may belong, and apply the triangle interpolation based on the chroma component values associated with the vertices of the first triangle, the input chroma value, and the input luma value. The coding device may apply the triangle interpolation based on the chroma component values associated with a different set of three vertices (e.g., vertices of a second triangle that the input luma value and the input chroma value may not belong).

The 2D LUT may be estimated (e.g., by an encoder) based on reconstructed chroma sample values and luma sample values, and an original version of the video content. The reconstructed chroma sample values and luma sample values may be phase aligned (e.g., via interpolation) before being used for the estimation. The 2D LUT may be coded in a video bitstream associated with the video content. An indication may be signaled in the video bitstream regarding whether 2D LUT-based color correction is enabled, and/or whether the 2D LUT is associated with a red difference chroma component (Cr) or a blue difference chroma component (Cb). Predictive coding may be applied to code the 2D LUT.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

Figure 1:
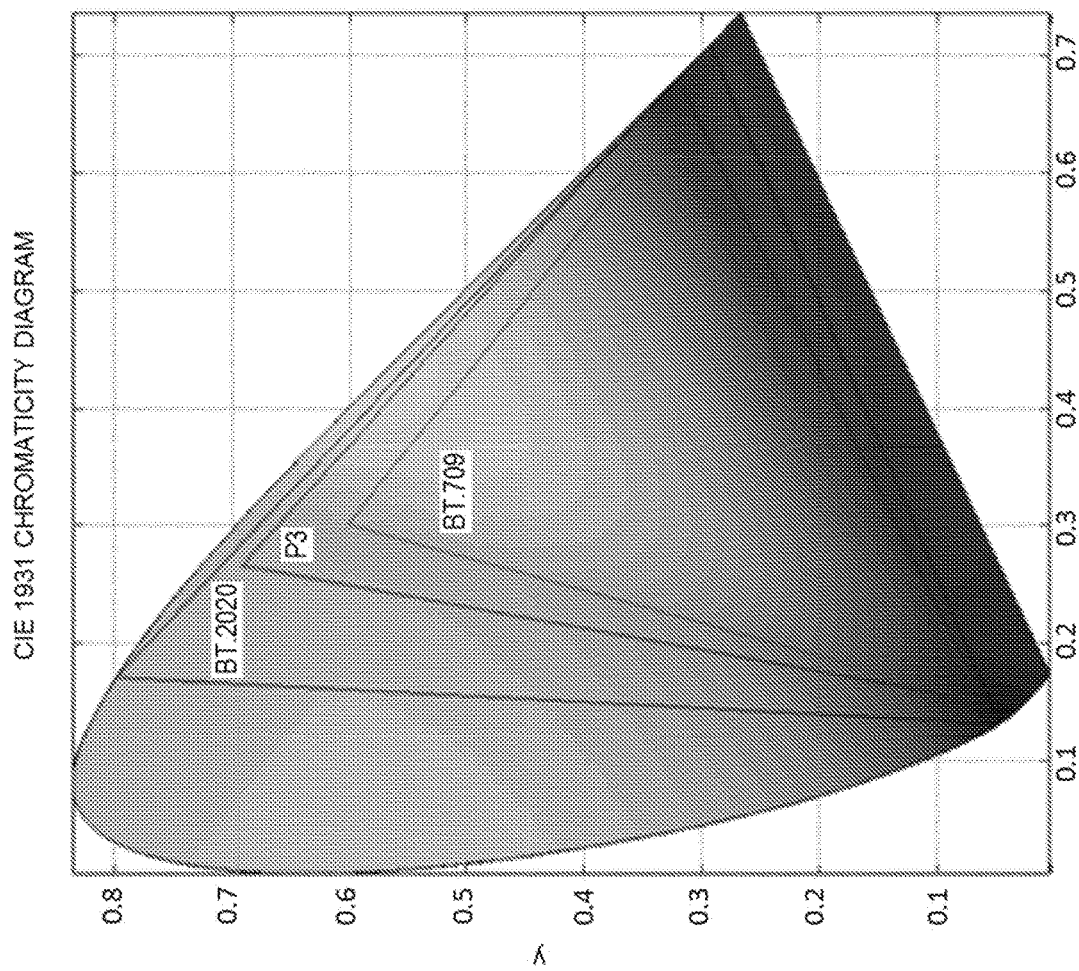
FIG. 1 provides an example comparison of BT.2020 (UHDTV), BT.709 (HDTV), and P3 (DC) color primaries.

A detailed description of illustrative embodiments will now be described with reference to the various Figures. Although this description provides a detailed example of possible implementations, it should be noted that the details are intended to be exemplary and in no way limit the scope of the application. The illustrative embodiments described herein may work with a variety of digital video compression technologies and/or standardized aimed at enabling efficient digital video communication, distribution and consumption. The technologies and/or standards may include those developed by ISO/IEC and ITU-T such as H.261, MPEG-1, MPEG-2, H.263, MPEG-4 part2, and H.264/MPEG-4 part 10 AVC. The technologies and/or standards may also include High Efficiency Video Coding (HEVC) jointly developed by ITU-T Video Coding Experts Group (VCEG) and ISO/IEC Moving Picture Experts Group (MPEG), which may achieve twice as much compression as H.264/AVC, or half of the bit rate that may be used to achieve the same video quality.

The illustrative embodiments described herein may be deployed in various digital video services including TV services (e.g., those over satellite, cable and/or terrestrial broadcasting channels), mobile video services (e.g., video chat, mobile video recording and sharing, and video streaming) that may require video transmissions in heterogeneous environments, and/or hybrid use scenarios (e.g., those known as 3-screen or N-screen, which may involve multiple consumer devices such as PCs, smart phones, tablets, and/or TVs, and which may have to accommodate video consumption on devices with widely varying capabilities in terms of computing power, memory/storage size, display resolution, display frame rate, display color gamut, and/or the like).

The illustrative embodiments described herein may be deployed on networks and/or transmission channels with varying characteristics in terms of, for example, packet loss rate, available channel bandwidth, burst error rate, and/or the like. In these environments, video data may be transmitted over a combination of wired networks and wireless networks with complex underlying transmission channel characteristics, and scalable video coding may be used to provide improved quality of experience for video applications running on devices with different capabilities over heterogeneous networks. For example, scalable video coding may encode a signal once at a high level of representation such as temporal resolution, spatial resolution, quality, and/or the like, but may enable decoding from subsets of the video streams depending on the specific rate and/or representation used by certain applications running on a specific client device. In some scenarios, such a scalable solution may save bandwidth and/or storage compared to non-scalable solutions. As a result, the video standards under which the illustrative embodiments described herein may be deployed (e.g., MPEG-2 Video, H.263, MPEG4 Visual, H.264, or HEVC) may have tools and/or profiles that support some modes of scalability.

The illustrative embodiments described herein may work with new video formats such as that defined for Ultra High Definition TV (UHDTV) applications. As shown in Table 1, UHDTV may support large spatial resolution (e.g., up to 4K×2K or 3840×2160, or 8K×4K or 7680×432), high framerate (e.g., up to 120 Hz), high sample bit depth (e.g., 10 bits or 12 bits), and/or wide color gamut. The illustrative embodiments described herein may support new color gamut such as the P3 color gamut used in, for example, digital cinema applications. FIG. 1 illustrates the differences between a BT.709 (HD) color gamut (inner triangle) and a BT.2020 (UHD) color gamut (outer triangle) overlaid with the CIE 1931 color space chromaticity diagram (horseshoe shape, which may represent the range of visible colors to human eyes). As shown by FIG. 1, the HD color gamut and the UHD color gamut may cover approximately 36% and 76% of the CIE 1931 color space, respectively. Thus, when compared to HD displays, UHD displays may be able to significantly increase the volume of reproducible colors and bring much more vivid and richer colors to viewers.

TABLE 1

Comparison of HDTV (BT.709) and UHDTV (BT.2020) technical specifications

|  |  | High Definition | Ultra High Definition |
|---|---|---|---|
| ITU-R BT series | | BT.709-5 (part 2) | BT.2020 |
| Spatial resolution | | 1920 × 1080 | 7680 × 4320, 3840 × 2160 |
| Temporal | Frame rate | 60, 50, 30, 25, 24 | 120, 60, 50, 30, 25, 24 |
|  | Scan | Progressive, interlaced | Progressive |
| Primary colors | Red primary | (0.640, 0.300) | (0.708, 0.292) |
|  | Green primary | (0.150, 0.330) | (0.170, 0.797) |
|  | Blue primary | (0.600, 0.060) | (0.131, 0.046) |
|  | White point | (0.3127, 0.3290) (D65) | |
| Coding format | | 8- and 10-bit | 10- and 12-bit |

The illustrative embodiments described herein may be used for High Dynamic Range (HDR) videos. Dynamic range generally represents the ratio between the minimum and maximum luminance perceived or captured in a real scene or a rendering device. It may be measured in terms of "f-stop" (or "f-number"), where one f-stop may correspond to a doubling of the signal dynamic range. The luminance in HDR may be measured in candela (cd) per $m^2$ (e.g., which may be referred to as "nits"). For example, in natural scenes, sunlight may have a dynamic range of around 6×108 nits; blue sky in the morning may have a range of 4600 nits; and night sky may have a range of 0.005 nits or lower. Varying luminance levels in natural scenes may lead to a dynamic range of around 100 million (e.g., around 37 f-stops). By comparison, the sky seen from inside a room through a window may have a dynamic range of around 10,000 nits; a face may have a range of about 50 nits; and a dark surface have a range of around 1 nit. Human vision is capable of adapting itself to light conditions that may vary by nearly 10 orders of magnitude (e.g., from starlight to sunlight). In contrast, traditional consumer displays may only support 100 nits peak luminance, which is far lower than the dynamic range of natural scene that human vision may be able to capture.

HDR may enhance viewing experience (e.g., Standard Dynamic Range (SDR) may only support a brightness range of 0.1 to a few hundred nits, and have a dynamic range of less than 10 f-stops). For example, HDR displays (e.g., those with peak luminance of 1000 to 4000 nits) and/or other HDR and/or wide color gamut (WCG) capable appliances (e.g., such as cameras capable of capturing HDR video of up to 14 f-stops) may extend the limits of human artistic expression.

In some cases (e.g., under MPEG's requirements for HDR and WCG content distribution and storage), HDR may correspond to more than 16 f-stops. A dynamic range between 10 and 16 f-stops may be considered an "intermediate" or "extended" dynamic range, which is significantly smaller than the dynamic range one would encounter in real life, and far from the capabilities of human vision.

Figure 2:
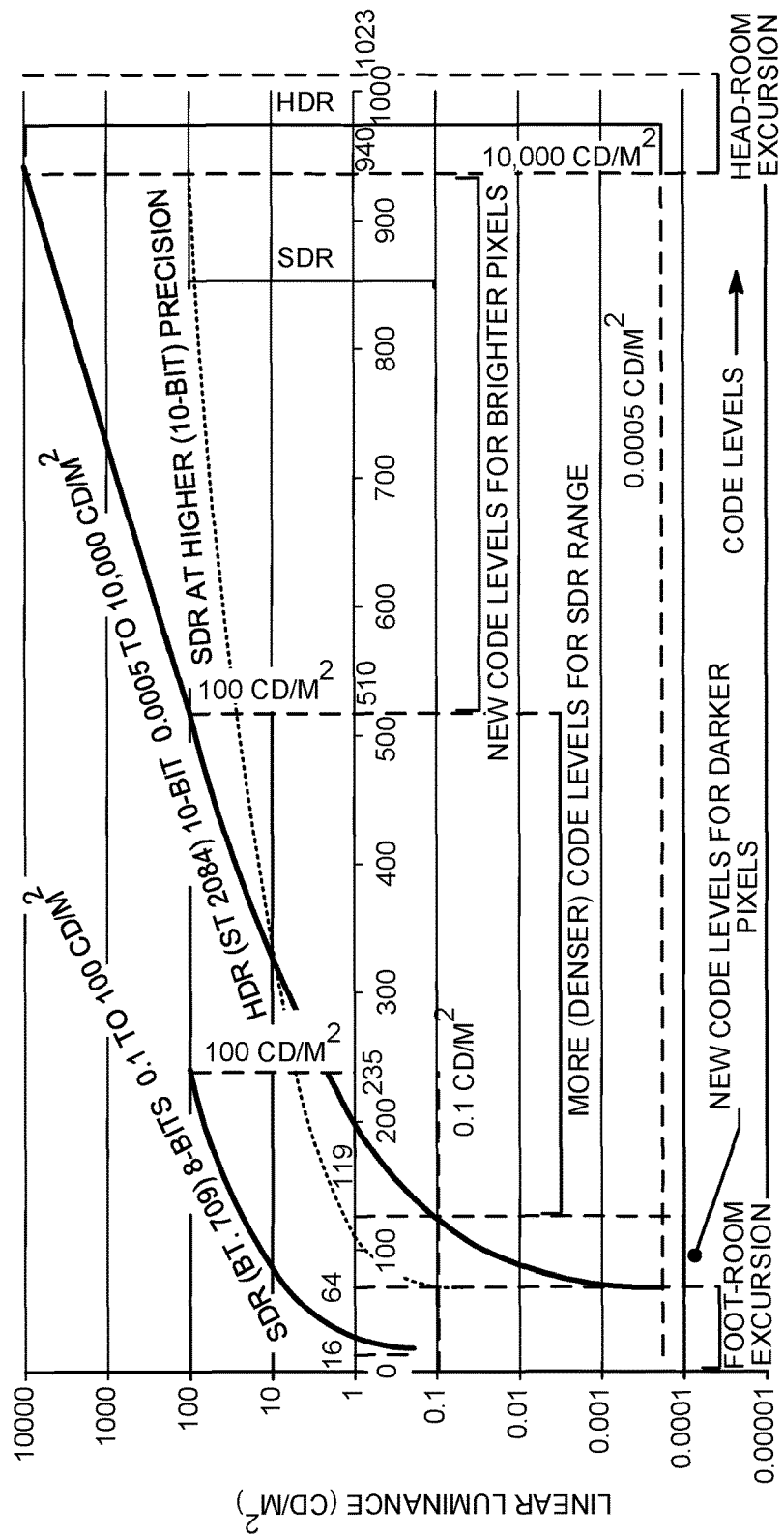
FIG. 2 shows an example mapping between linear light values and code levels for SDR and HDR representations.

An objective of HDR videos is to offer a dynamic range closer to the capacity of human vision. Various test sequences may be conducted to evaluate HDR technologies. For example, native test sequences may cover BT.709 and P3 color gamuts, and be stored in BT.2020 and BT.709 containers. The relevant file format may be EXR or TIFF. The peak luminance of the test sequences may be approximately 4000 nits. The transfer function (TF) used to convert a linear signal to a non-linear signal (e.g., for compression purposes) may be a perceptual quantizer ("PQ") (e.g., instead of a gamma function that may be used in SDR coding). FIG. 2 illustrates some of the differences between an example perceptual quantizer used for HDR and an example generic transfer function used for SDR.

Objective quality evaluation for HDR compression may be complex, for example, because there may be many different types of distortions in HDR compressed videos such as color bleeding and color banding, in addition to the usual blurring, blocking and ringing artifacts. The distortions and/or artifacts may be perceptible to a viewer (e.g., against a bright background). Various metrics may be considered for objective quality evaluation of HDR and WCG. These metrics may include, for example, peak signal-to-noise ratio (PSNR) in the XYZ domain with a transfer function (e.g., which may be referred to as tPSNR), PSNR evaluation in linear RGB with gamma being equal to 2.2 (e.g., which may be referred to as mPSNR), PSNR measured by applying the CIE deltaE2000 metric to the original signal and reconstructed signal (e.g., which may be referred to as PSNR_DE2000), visual difference predictor (VDP2), visual information fidelity (VIF), and/or structural similarity (SSIM). Particular metrics may be selected in a given scenario. For example, tPSNR, mPSNR and PSNR_DE2000 may be used as metrics (e.g., major metrics) for call for evidence ("CfE"). A subjective quality evaluation procedure for HDR CfE evaluation may be specified. For example, a side by side viewing comparison between an original cropped video and a cropped video produced under a test method may be performed, and a HDR display may be calibrated (e.g., peak brightness, display uniformity, and the like).

A test methodology for HDR may comply with an international standard such as international telecommunication union (ITU) Recommendation BT.500-13 DSIS version I. Under the example recommendation, two types of HDR displays may be used in a subjective quality evaluation: SIM2 and Pulsar. A viewer may focus on different areas of a HDR video (e.g., since HDR offers more details than SDR), which may affect the variation of the subjective quality evaluation. There may be at least three categories in CfE. Category 1 may be related to coding technologies that offer compression efficiency improvement over HEVC Main 10 Profile for HDR with BT.709 or P3D65 color gamut content. Normative changes may be made for these coding technologies. Category 2 may be related to backward compatible solutions for HDR with BT.709 or P3D65 contents (e.g., using layered or scalable solutions). Category 3 may be related to performance optimization of the existing Main 10 Profile and/or Scalable Main 10 Profile for HDR with BT.709 or P3D65 color gamut content (e.g., without introducing normative changes).

Figure 3:
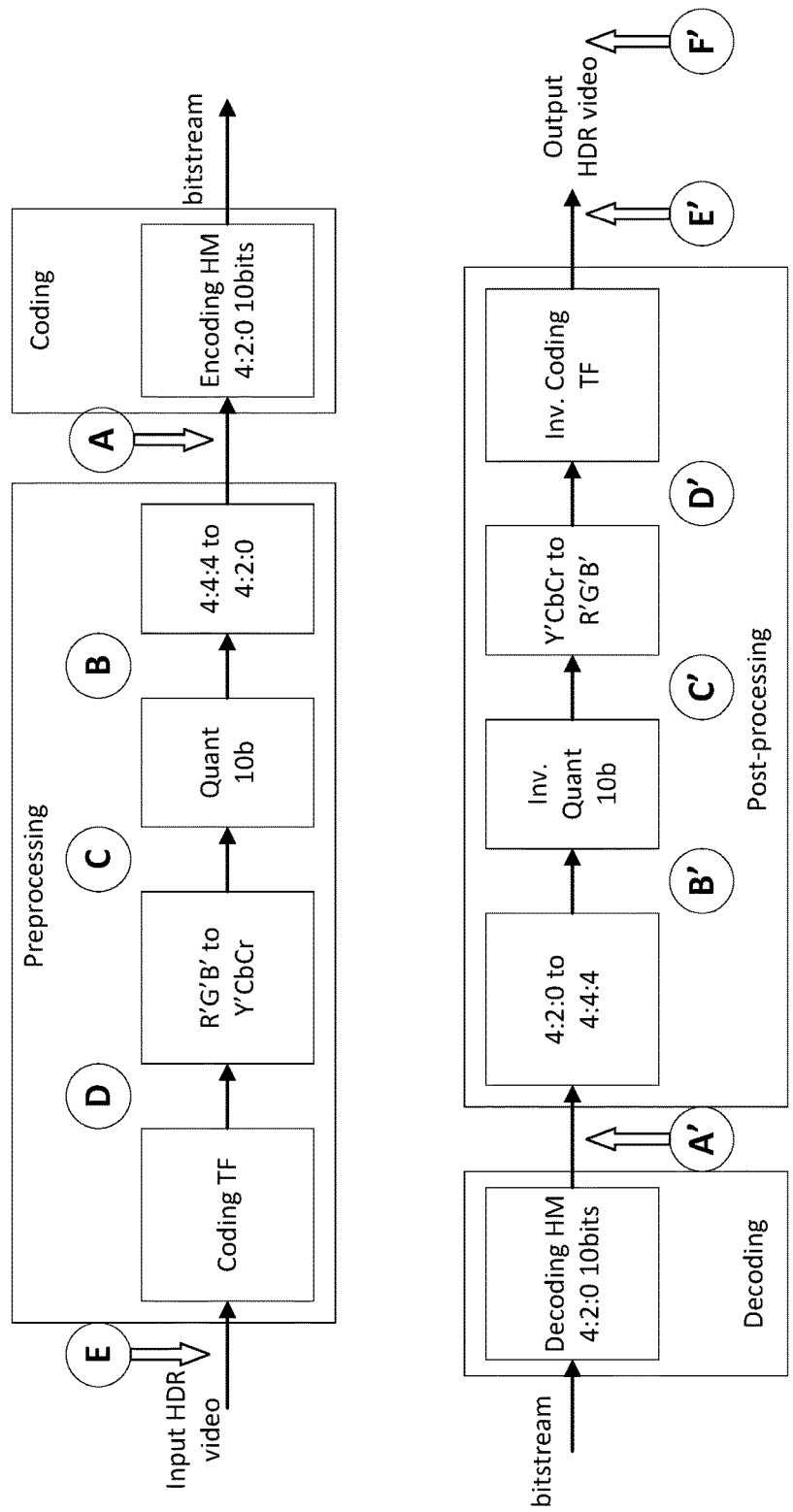
FIG. 3 shows example HDR video coding and decoding operations.

FIG. 3 shows an example HDR coding/decoding workflow. The workflow may include one or more of the following. The workflow may include preprocessing, for example to convert a linear signal (e.g., linear floating point RGB) to a signal suitable for compression (e.g., 10-bit YCbCr). Such preprocessing may include, for example, linear to non-linear conversion with a transfer function (e.g., linear RGB to non-linear RGB), color space conversion (e.g., RGB to YCbCr), floating point to fixed point conversion (e.g., quantizing floating point sample values to 10-bit values) and/or chroma format conversion (e.g., chroma 4:4:4 to 4:2:0). The workflow may include compression/decompression with a single layer codec (e.g., HEVC Main 10 codec), a scalable codec (e.g., SHVC Scalable Main 10 codec), and/or the like. The workflow may include post-processing to convert decompressed signal back to a linear signal (e.g., linear floating point RGB). Such post-processing may include, for example, inverse chroma format conversion (e.g., chroma 4:2:0 to 4:4:4), inverse conversion from fixed point to floating point (e.g., 10-bit to floating point), inverse color space conversion (e.g., YCbCr to RGB), and/or conversion from non-linear to linear with an inverse transfer function. Evaluation of a conventional SDR coding technique may be performed between A and A' of FIG. 3. Evaluation of HDR coding may be performed between E and E' of FIG. 3 (e.g., at various bitrates). Distortions (e.g., color distortions) to a video signal could be introduced in one or more processes shown in FIG. 3 (e.g., before compression and/or after decompression). The example workflow of FIG. 3 may involve format conversions (e.g., linear to non-linear, one color space to another, one chroma format to another, sample value range conversion, and/or the like). Objective quality metrics calculation (e.g., tPSNR, mPSNR, and/or PSNR_DE2000) may be conducted for the workflow, for example, by taking all or a subset of the processes involved into consideration. Certain conversion and metrics calculation tools may be provided to make compression and/or evaluation feasible. The outcome of the objective metrics calculation may depend on the platform on which the calculation is executed (e.g., because floating point calculation is used). One or more pieces of information may be signaled, including, for example, transfer functions that were utilized and/or color space and tone mapping related information. Table 2 lists example tools that may be used for processing HDR and/or WCG video contents.

TABLE 2

Overview of Example HEVC tools related to HDR and WCG

| Metadata | Purpose |
| --- | --- |
| video signal type related syntax elements | "video_full_range_flag," "colour_primaries," "transfer_characteristics," and "matrix_coeffs" define some properties of a coded video container: sample value range, color primaries, transfer function, and color space to map video sample code levels to display intensities. Besides the |

TABLE 2-continued

Overview of Example HEVC tools related to HDR and WCG

| Metadata | Purpose |
| --- | --- |
| defined in video usability information (VUI) | traditional ITU-R BT.709 combination required by DVD, ATSC, DVB, and/or Blu-ray 1.0, some camera log transfers and a new PQ (e.g., SMPTE ST 2084) among others could be selected. |
| tone mapping information in supplemental enhancement information (SEI) messages | Provides information to enable remapping of the color samples of an output decoded picture for customization to particular display environments. It may include multiple methods to transmit one or more curves compactly within the bit-stream, where each curve may target a different mapping scenario. |
| mastering display color volume SEI message | Signal brightness range, primaries, and white point of a display monitor used during the grading of video contents (e.g., SMPTE ST 2086). |
| color remapping information SEI message | Provides information to enable remapping of reconstructed color samples of an output picture. |
| knee function information SEI message | Provides information to enable mapping of the color samples of a decoded picture for customization to particular display environments. A knee function may be a piecewise linear function. |
| CGS/BDS look-up table in Picture Parameter Set | Normative color mapping between a base layer (BL) and a SHVC enhancement layer (EL) (e.g., BT.709 BL → BT.2020 EL), for bit depth and color gamut scalability. |

Chroma artifacts in HDR video contents may be perceptible to a viewer (e.g., in medium and low bit rates) on HDR displays (e.g., with peak luminance of 4000 nits). The artifacts may include, for example, hue changes in some objects (e.g., white wall may look like light red/blue), and/or unnatural look of a person's skin. The artifacts in a scene may become more perceptible when the scene becomes brighter (e.g., since color related artifacts may stand out and/or flicker when the video is played in real-time). For example, in a scene involving a building under bright sunlight, color patches may noticeably appear on walls and/or window shutters because of chroma distortions as noted above.

Chroma distortion may be generated by one or more sources. For example, chroma distortions may be introduced in the preprocessing stage (e.g., when the RGB to YCbCr conversion is performed after the transfer function, and/or when chroma components Cb/Cr are downsampled). This may be illustrated in FIG. 4. Before going through a transfer function (TF), a video signal may be linear. The transfer function may convert the linear signal into a non-linear signal. When the non-linear signal is converted back to the linear domain (e.g., at a decoder), evenly distributed errors (e.g., color artifacts) of the non-linear domain may become unevenly distributed in the linear domain. For example, suppose $P_L$ is a sample value in the linear domain, and $P_N$ is a corresponding sample value in the non-linear domain, the following relationship may exist between $P_L$ and $P_N$:

$$P_N = TF(P_L)$$

Figure 4:
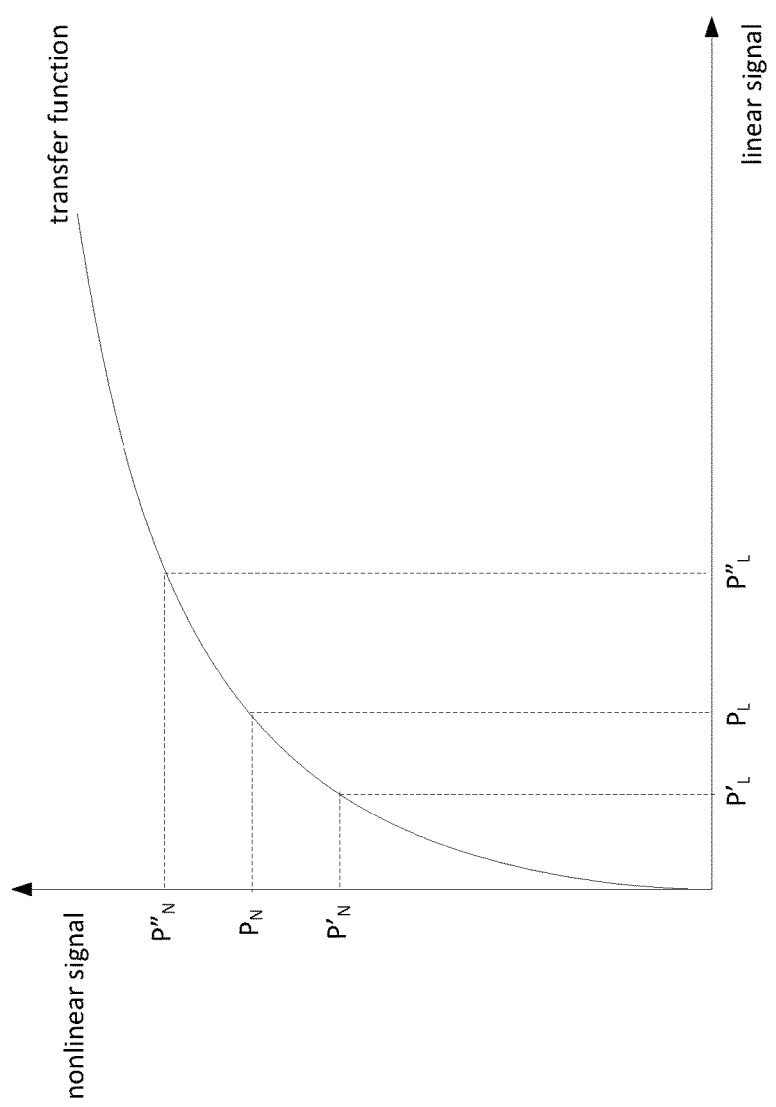
FIG. 4 shows an example color distortion resulted from a transfer function.

Assuming an evenly distributed chroma error has occurred to $P_N$ (e.g., due to chroma downsampling and/or upsampling) and resulted in sample values $P'_N$ and $P''_N$ (as shown in FIG. 4), the following may be true:

$$\|P_N - P'_N\| = \|P_N - P''_N\|$$

After inverse TF, $P'_N$ and $P''_N$ may be converted to $P'_L$ and $P''_L$, respectively, and the error in $P'_L$ may become smaller than the error in $P''_L$ due to the conversion:

$$\|P_L - P'_L\| < \|P_L - P''_L\|$$

The effect of uneven errors as described herein may be dependent upon the value of $P_L$ itself. For example, the effect may be greater when the value is small (e.g., representing a dark part of the scene). Color distortions and/or of other types of color-related errors may be corrected in the preprocessing stage. For example, color correction techniques may be applied to reduce errors that occurred during chroma downsampling by performing chroma downsampling in the linear domain instead of the non-linear domain.

Additionally or alternatively, color correction may take into consideration the compression process. Color correction may be applied after decoding and/or may use a look-up table (LUT). In some embodiments (e.g., where the video signal is encoded in YCbCr), a color space associated with the video signal may be partitioned into small units (e.g., rectangular units), and color correction may be applied based on the characteristics of those units. The color space may be partitioned in different ways. For example, the color space may be partitioned in one dimension (e.g., the blue difference chroma (Cb) dimension, red difference chroma (Cr) dimension or luma (Y) dimension, depending on the dimension in which color correction is applied). The color space may be partitioned in two dimensions (e.g., in the Y dimension and the Cb dimension if color correction for Cb is to be applied, or in the Y dimension and the Cr dimension if color correction for Cr is to be applied). Various 2D partition methods may be used. For example, a quadtree partition method may be used to symmetrically or asymmetrically partition the color space across different dimensions. For example, a maximum number of times that a dimension (e.g., the luma or chroma dimension) may be partitioned (e.g., be split) may be specified such that partitioning may stop in the dimension when the maximum number has been reached. Each partitioning/split may be associated with a layer. For example, layer 0 may represent the original 2D color space (e.g., without partitioning/splitting). Layer 1 may represent the 2D color space being partitioned once. Layer 2 may represent the 2D color space being partitioned twice. And so on. If the maximum number of partitioning is the same for both dimensions, symmetric partitioning of the color space may be achieved. If the maximum number of partitioning in one dimension is different from that of the other dimension, asymmetric partitioning of the color space may be achieved. The color space may be partitioned in three dimensions (e.g., in the Y, Cb and Cr dimensions) in similar manners as described herein.

A look-up table (LUT) may be utilized in various coding/decoding operations. For example, a 3D LUT may be used for color space conversion, as illustrated below. Denote (y, u, v) as a sample triplet in the color gamut of a base layer (BL), and (Y, U, V) as a triplet in the color gamut of an enhancement layer (EL). With a 3D LUT, the entire range of a BL color space may be segmented into equal octants. The input of the 3D LUT may be (y, u, v) in the BL color gamut, and the output of the 3D LUT may be (Y, U, V) (e.g., which may be a mapped triplet) in the EL color gamut. During conversion, if the input (y, u, v) overlaps with one of the vertices of the octants, the output (Y, U, V) may be derived by referencing one of the 3D LUT entries. If the input (y, u, v) lies inside one of the octants, an interpolation process may be applied to derive the output. Various interpolation methods may be used including, for example, trilinear and tetrahedral interpolations. Trilinear-interpolation references the nearest eight vertices and may be carried out using the following equations:

$$Y = K \times \sum_{i=0,1} \sum_{j=0,1} \sum_{k=0,1} s_i(y) \times s_j(u) \times s_k(v) \times LUT[y_i][u_j][v_k] \cdot Y \quad \text{(A)}$$

$$U = K \times \sum_{i=0,1} \sum_{j=0,1} \sum_{k=0,1} s_i(y) \times s_j(u) \times s_k(v) \times LUT[y_i][u_j][v_k] \cdot U \quad \text{(B)}$$

$$V = K \times \sum_{i=0,1} \sum_{j=0,1} \sum_{k=0,1} s_i(y) \times s_j(u) \times s_k(v) \times LUT[y_i][u_j][v_k] \cdot V \quad \text{(C)}$$

$$K = \frac{1}{(y_1 - y_0) \times (u_1 - u_0) \times (v_1 - v_0)}$$

$y_i$, $u_j$, $v_k$) may represent the vertices of the BL color gamut (e.g., inputs to the 3D LUT). $LUT[y_i][u_j][v_k]$ may represent the vertices of the EL color gamut (e.g., outputs of the 3D LUT at entry ($y_i$, $u_j$, $v_k$). $LUT[y_i][u_j][v_k].Y$, $LUT [y_i][u_j][v_k].U$, and $LUT [y_i][u_j][v_k].V$ may be the Y, U, and V components of the vertex $LUT[y_i][u_j][v_k]$, respectively. i,j, k={0, 1}, and $s_0(y)=y_1-y$, $s_1(y)=y-y_0$, $s_0(u)=u_1-u$, $s_1(u)=u-u_0$, $s_0(v)=v_1-v$, $s_1(v)=v-v_0$ may represent the weights. Additionally or alternatively, tetrahedral interpolation may be used (e.g., to reduce computational complexity).

A 3D LUT may be estimated by an encoder, e.g., using an original signal in one color space and a corresponding signal in another color space. A Least Square (LS) estimation method may be utilized to estimate the 3D LUT if the 3D LUT interpolation process is linear. A gradient descent based iterative method may also be used for the estimation. For example, when converting a BT.709 color gamut to a BT.2020 color gamut, the input signal in the 3D LUT estimation may be a BT.709 compressed/uncompressed video, and the output signal may be a BT.2020 video (e.g., which is the training reference or target).

The color gamut conversion process may be illustrated by Equation (G)

$$z_i(c)=f_{P(c)}(x_i), i \in [0, N-1] \quad \text{(G)}$$

where x may denote the input signal in the form of a triplet (y,u,v) in BT.709. z(c) may be the output signal of component c, where c may be Y, U or V in BT.2020. P(c) may be the parameters of component c to be estimated, and the 3D LUT output of component c. $f_{P(c)}$ may be the interpolation function, which may be a linear function such as trilinear or tetrahedral as described herein. i may be the index of an input pixel. N may be the total number of input pixels.

The equation may be rewritten in the form of matrices:

$$z_i(c)=\vec{w}_i(c)*P(c), i \in [0, N-1] \quad \text{(H)}$$

* in Equation(H) may represent matrix multiplication. $\vec{w}_i(c)$ may be the weighting vector for the i-th input pixel, and may be represented as $\vec{w}_i(c)=[w_{i,0} \ldots w_{i,M-1}]$, $i \in [0,N-1]$. $w_{i,j}$ may be the weight of the j-th output entry of the 3D LUT for the i-th input pixel. For example, $w_{i,j}$ may be calculated according to Equation (A)–(C) for trilinear interpolation. P(c) may be the parameter vector to be estimated. The parameter vector may be the output entries of the 3D LUT and may be represented as $P(c)=[p_0 \ldots p_{M-1}]$. M may be the number of 3D LUT output entries. For example, M may be 4913 for a 3D LUT with a size of 17×17×17. Component c may be omitted from the following equations because the 3D LUT of each component may be estimated independently. When Equation (H) is aggregated for the pixels, the following may be obtained:

$$Z = W * P \quad \text{(I)}$$

$$Z = [z_0 \ldots z_{N-1}]^T$$

$$W = \begin{bmatrix} w_{0,0} & w_{0,1} & \ldots & w_{0,M-1} \\ \vdots & \vdots & \ddots & \vdots \\ w_{N-1,0} & w_{N-1,1} & \ldots & w_{N-1,M-1} \end{bmatrix} \quad \text{(J)}$$

With an Least Square estimation, the following may be derived:

$$P=H^{-1}*(W^T*Z) \quad \text{(K)}$$

$$H=(W^T*W) \quad \text{(L)}$$

where H is an auto-correlation matrix.

For at least some input video signals (such as a BT.709 video signal), color conversion using a 3D LUT may utilize only 20% of the 3D LUT entries. The matrix W shown in Equation (J) may be sparse (e.g., it may include one or more zero elements). An auto-correlation matrix H as defined in Equation (L) may also be sparse, and may not be invertible. The solution provided in Equation (K) may not be available for that auto-correlation matrix H. To address one or more of the foregoing issues, the matrix W may be compacted (e.g., by only considering referenced entries of the 3D LUT). One example method to compact the matrix W may comprise scanning the input pixels (y,u,v) of the input video signal and masking the 3D LUT vertices used in 3D LUT interpolation. The method may further comprise deriving a compact parameter set P'=compact(P) (e.g., by removing unused vertices), and determining a mapping from P' to P that may be used to reconstruct P after P' has been estimated.

W' and H' may be calculated, for example, using the compacted P', where unused vertices may have been removed. The solution may be defined as:

$$P'=H'^{-1}*(W'^T*Z) \qquad (M)$$

$$H'=(W'^T*W') \qquad (N)$$

Using the example method described herein, the sparsity of the matrix W may be reduced for 3D LUT estimation. The memory that may be used to store the auto-correlation matrix H for the 3D LUT estimation may also be reduced after the compaction since the size of H' may be smaller than H.

As described herein, the color distribution of an input video may not be even. For example, pixels may have similar colors. Some colors may occur more often than others. Colors with high occurrence rates may be referred to as major colors. The uneven distribution of colors may create an unbalance in W'. For example, elements of W' that correspond to major colors may have large values. Elements of W' that correspond to non-major colors (e.g., colors occur less often) may have small values. The result may be that the dynamic range of the elements in the auto correlation matrix H' may be large, which may cause the inversion of H' and/or the estimation of P' to become unstable. A constraint may be provided and/or used to establish a trade-off between the accuracy and stability of the estimation, for example, as illustrated below:

$$H'=(W'^T W')+\lambda I, \ \lambda \geq 0 \qquad (O)$$

I may be a unary matrix. $\lambda$ may be a factor for balancing the accuracy and stability of the estimation process. For example, a larger $\lambda$ may indicate that preference is given to the stability of the process. The value of $\lambda$ may be determined, for example, based on the extent of unbalance in W'.

After the compact parameter vector P' has been estimated, the original parameter vector P may be obtained by mapping the estimated vertices from P' to P, as illustrated below:

$$P=\text{decompact}(P') \qquad (P)$$

The unused vertices in P may be filled using corresponding vertices in P' via an interpolation process (e.g., trilinear or tetrahedral) suitable for 3D LUT coding.

Corrected chroma samples in a partitioned color space may be approximated as a plane comprising a luma dimension and a chroma dimension (e.g., either Cr or Cb). A two-dimensional (2D) LUT based on quadtree partition may be used to restore the chroma samples (e.g., after HDR decoding). The 3D LUT estimation methodology described herein may be applied at least partially to 2D LUT estimation, for example by using a triangle interpolation method instead of the interpolation methods associated with 3D LUT estimation.

Figure 5:
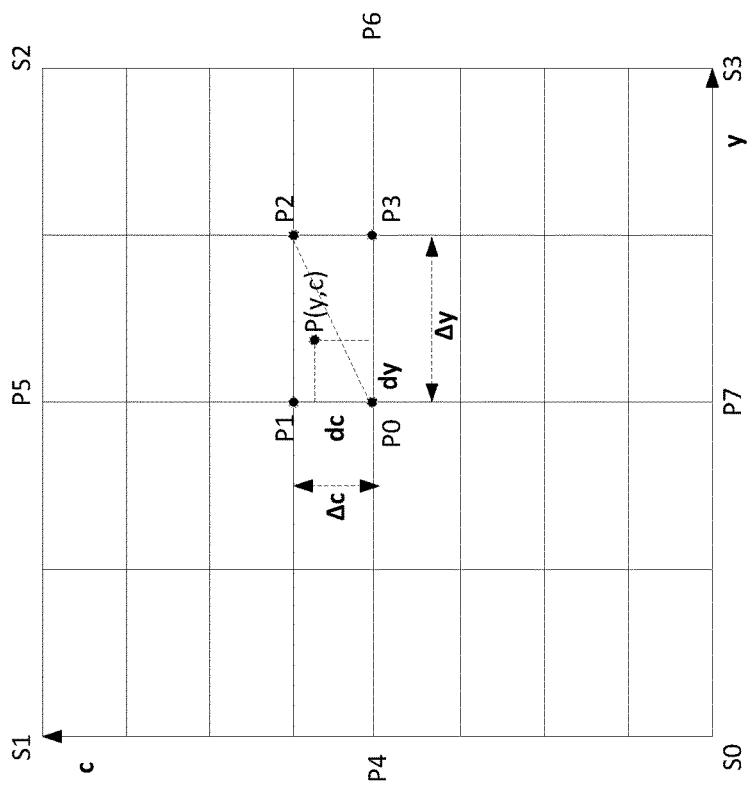
FIG. 5 shows an example triangle interpolation method that may be used to derive a corrected chroma value based on a two-dimensional look-up table.

FIG. 5 shows that a color space associated with a particular video content may be partitioned along a luma dimension y and a chroma dimension c (which may be Cr or Cb) asymmetrically. For example, quadtree partitioning may be used (e.g., with the maximum numbers of splits/layers in the luma and chroma dimensions set to 2 and 3, respectively) to obtain this partition shown in FIG. 5. As shown, the whole (y, c) space may be partitioned into 4×8 small rectangles, and there may be a total of (4+1)×(8+1) vertices (e.g., nine vertices along the chroma component axis and five vertices along the luma component axis). "c" may indicate the chroma component, which could be either Cb or Cr. "y" may indicate the luma component. A 2D LUT may be estimated that includes luma components and chroma components associated with the respective vertices of the 2D color space. The luma components and chroma components may represent corrected luma and chroma values of the 2D color space. P(y, c) may be an input sample point to be color-corrected. P(y, c) may comprise a luma sample value and a chroma sample value corresponding to the luma and chroma dimensions of the 2D LUT, respectively. P(y, c) may have been derived via phase alignment and/or chroma upsampling, as described herein. P(y, c) may be located in a rectangle partition marked by four vertex points (P0, P1, P2, P3). (dy, dc) may represent the offset of P(y, c) relative to point P0.

As shown in FIG. 5, P may be enclosed inside the triangle marked by three vertex points (P0, P1, P2). Let "C" represent the corrected value for the chroma component. This corrected chroma component value at position P may be denoted as C(P), and may be calculated via triangle interpolation based on the 2D LUT and the input sample point P, as follows:

$$C(P)=\text{LUT\_c}[P0]+dc\times(\text{LUT\_c}[P1]-\text{LUT\_c}[P0]))/\Delta c+dy\times(\text{LUT\_c}[P2]-\text{LUT\_c}[P1])/\Delta y \qquad (1)$$

LUT_c may represent a look-up table for producing corrected chroma values. LUT_c[Pi], i={0, 1, 2}, may represent corrected chroma component values at respective vertices Pi (e.g., a subset of the entries in the 2D LUT). $\Delta y$ and $\Delta c$ may be the basic rectangle size in the y and c dimensions, respectively.

If P is enclosed inside the triangle (P0, P3, P2) instead of the triangle (P0, P1, P2), interpolation may be performed based on the triangle (P0, P2, P3) and the input sample point P (e.g., in similar manners as illustrated in Equation (1)), as follows:

$$C(P)=\text{LUT\_c}[P0]+dy\times(\text{LUT\_c}[P3]-\text{LUT\_c}[P0]))/\Delta y+dc\times(\text{LUT\_c}[P2]-\text{LUT\_c}[P3])/\Delta c \qquad (2)$$

The interpolation process may first determine which triangle the input point is located in, and then apply Equation (1) or (2) accordingly (e.g., based on that determination). In certain implementations (e.g., to reduce complexity), the determination step may be bypassed, and either Equation (1) or (2) may be used to calculate a corrected chroma component value for an input point inside the rectangle (P0, P1, P2, P3). Without loss of generality, assume that the triangle (P0, P1, P2) may be selected to calculate respective corrected values for the input points inside (P0, P1, P2, P3). Then, for an input P located outside the triangle (P0, P1, P2) (e.g., P is instead located inside triangle (P0, P2, P3)), Equation (1) may become extrapolation rather than interpolation.

P(y, c) may overlap with one of the vertices of the 2D color space. In that case, the interpolation/extrapolation operations described herein may still be applied to derive a corrected chroma value for P. Alternatively, the corrected chroma value for P may be derived by directly referencing the chroma value in the 2D LUT that is associated with the vertex with which P overlaps.

Figure 6:
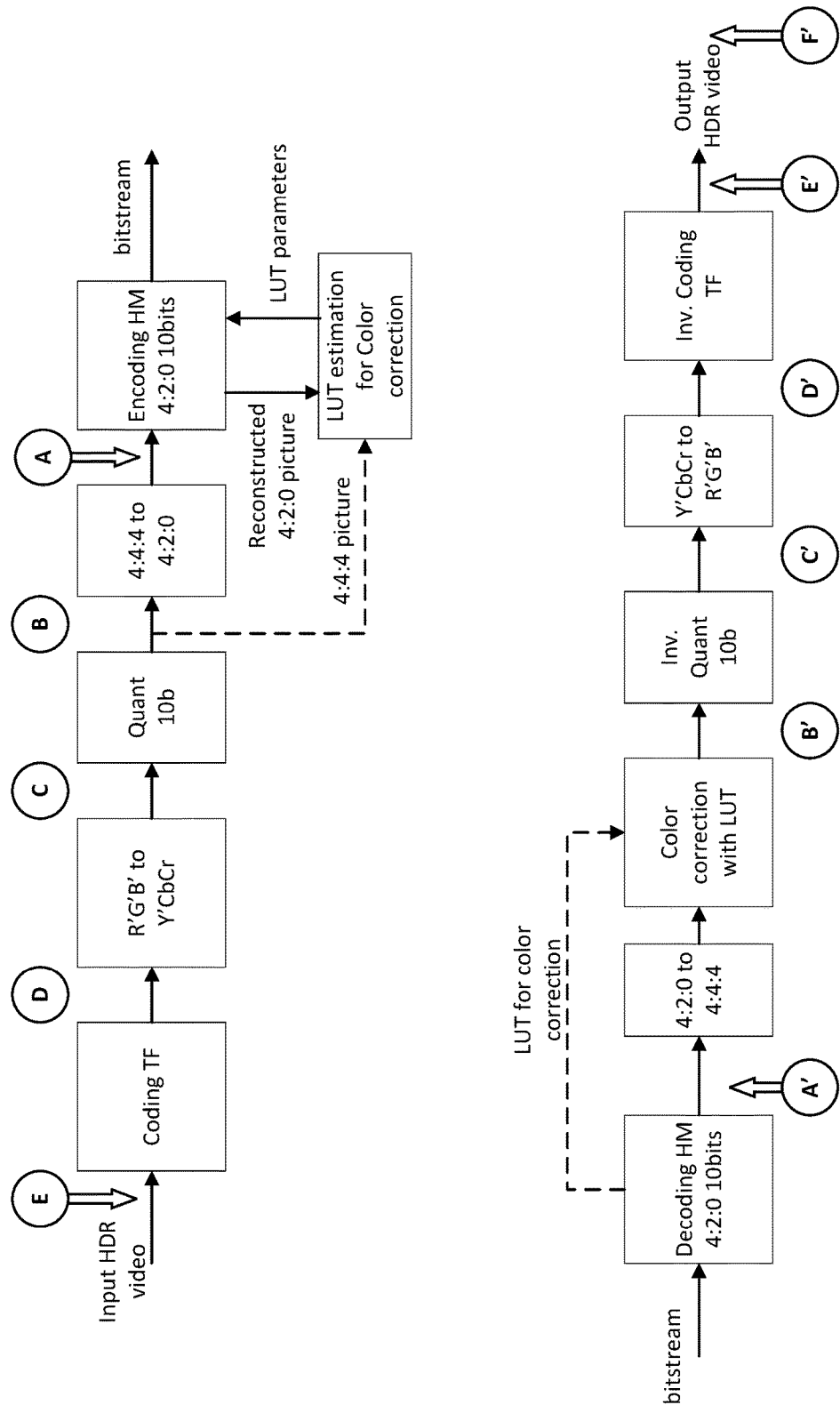
FIG. 6 shows example HDR coding and decoding operations with LUT-based color correction.

Color correction may be applied after chroma upsampling in the HDR coding process. FIG. 6 shows an example diagram for encoding and decoding a video signal, and applying color correction in chroma 4:4:4 format. At the encoding stage, a 2D LUT may be estimated using various estimation methods including, for example, the Least Square method described herein. The estimation may be performed based on an original version of the video content (e.g., which may be in chroma 4:4:4 format) and/or an upsampled version of the video content (e.g., an upsampled 4:4:4 picture derived from a reconstructed 4:2:0 picture that may be stored in a decoded picture buffer (DPB) of the encoder). As mentioned herein, the Least Square method may be used with tetrahedral interpolation for 3D LUT estimation. The same methodology may be applied for 2D LUT estimation with a different interpolation method (e.g., such as the triangle interpolation method depicted in Equation (1) or (2), or a combination of Equations (1) and (2)). The resulting look-up table may be signaled in an output bitstream associated with the video content. A decoder and/or a post-processing device may receive the bitstream and decode the video content. The decoder and/or post-processing device may apply color correction to the decoded video signal in 4:4:4 format based on the LUT table comprised in the bitstream (e.g., as described herein).

Figure 7:
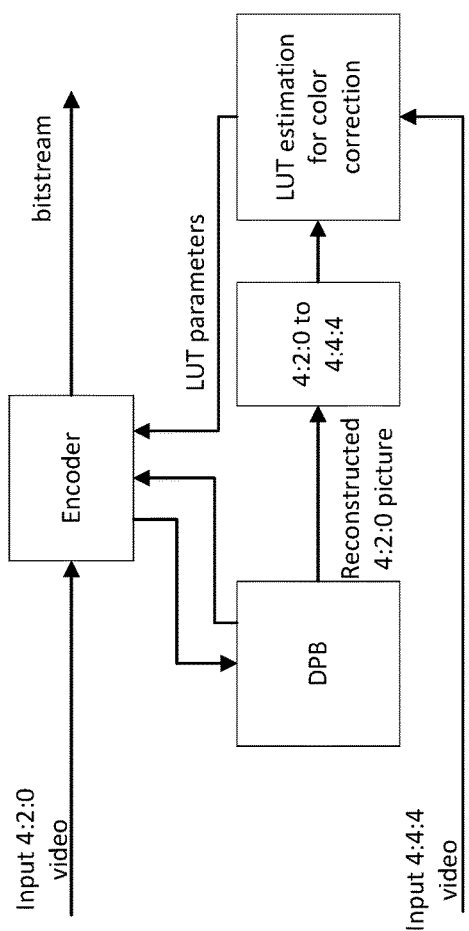
FIG. 7 shows an example diagram for conducting LUT parameter estimation in a 4:4:4 format.

FIG. 7 shows an example diagram for estimating LUT parameters at an encoder. A reconstructed YCbCr 4:2:0 picture comprising one or more luma and chroma samples may be received from the encoder's decoded picture buffer (DPB). The reconstructed picture may be upsampled to a 4:4:4 format. Various chroma upsampling techniques and/or filters may be applied. For example, a 4-tap interpolation filter in HEVC motion compensation for chroma component at phase ¼ and ¾ may be used for vertical upsampling, as illustrated below. A bilinear interpolation filter may be used for horizontal upsampling.

¼ phase: {−4, 54, 16, −2}

¾ phase: {−2, 16, 54, −4}

The upsampled picture and the original picture (e.g., in 4:4:4 format) may be used for estimating a look-up table (e.g., a 2D LUT). For example, to estimate the Cb components of a 2D LUT comprising a Y dimension and a Cb dimension, the Y and Cb components of the upsampled picture may be used. To estimate the Cr components of a 2D LUT comprising a Y dimension and a Cr dimension, the Y and Cr components of the upsampled picture may be used. When applying LUT-based color correction in the 4:4:4 chroma format, the sampling grids of the three components for LUT input and output (e.g., a luma component and a distorted chroma component at the input, and a corrected chroma component at the output) may be aligned. Therefore, phase alignment considerations as described herein may be skipped. The choice of upsampling methods in these situations may be flexible since color correction is applied after the upsampling.

Figure 8:
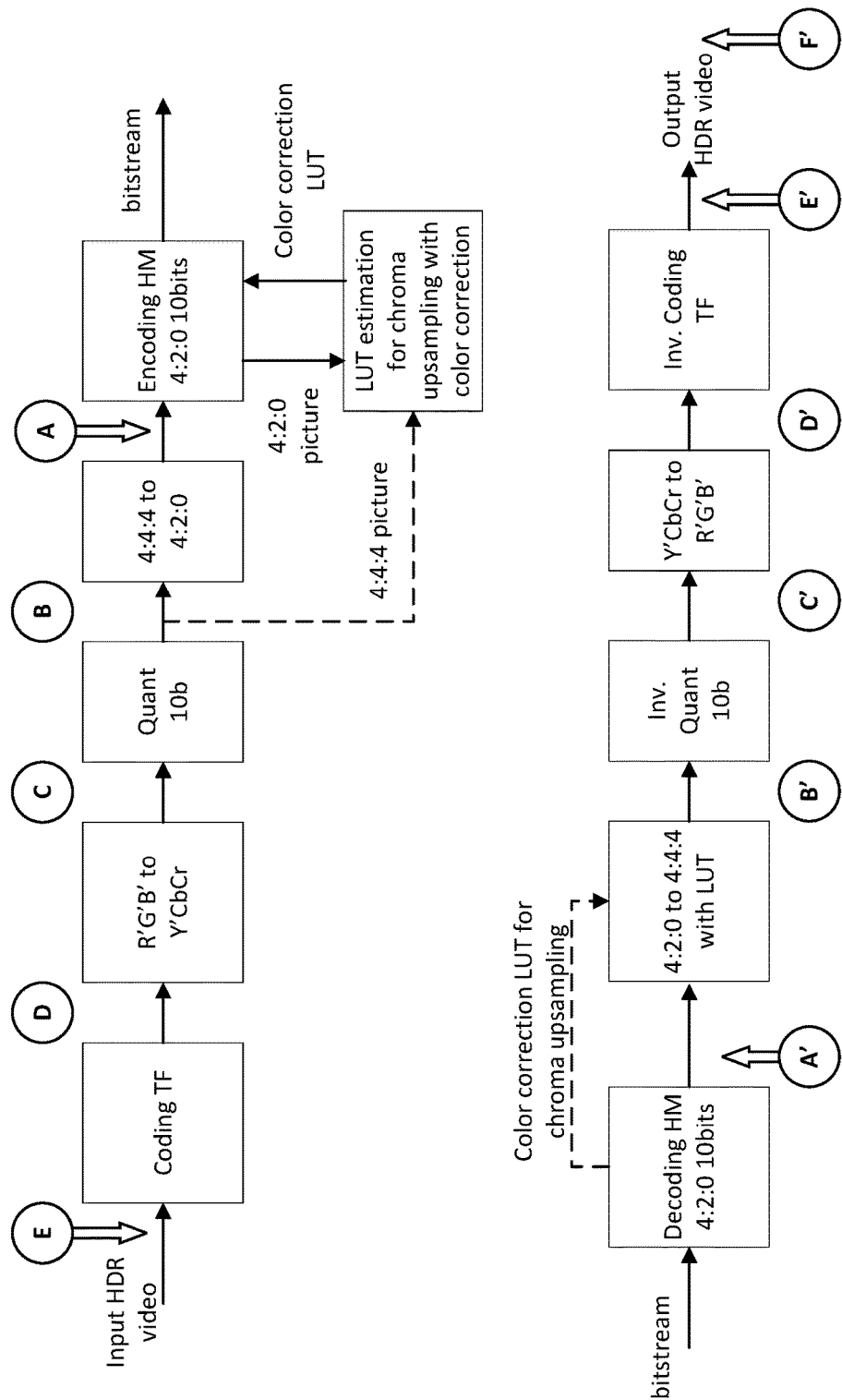
FIG. 8 shows example HDR coding and decoding operations with LUT-based color correction and chroma upsampling.

LUT-based color correction may include a phase alignment operation (e.g., aligning the samples locations of chroma and luma samples). Phase alignment may be conducted during chroma upsampling, thus combining the color correction and chroma upsampling operations. Among other things, such an approach may reduce the complexity of the relevant systems, methods and/or instrumentalities. FIG. 8 shows an example diagram for coding and decoding an HDR video signal, and for applying LUT-based color correction during chroma upsampling. The input to the combined chroma upsampling and LUT-based color correction process may be a reconstructed picture in 4:2:0 format (e.g., a reconstructed 4:2:0 picture with luma samples and distorted chroma samples). The output of the process may be a color-corrected picture in 4:4:4 format. At the encoding stage, a LUT may be estimated that may be used for combined chroma upsampling and color correction. The LUT may be signaled in an output bitstream. A decoder and/or post-processing device may receive the video bitstream and decode the video content included therein. The decoder and/or post-processing device may apply color correction to the decoded video content based on a look-up table (e.g., a 2D LUT) comprised in the bitstream while upsampling the video content (e.g., from a 4:2:0 format to a 4:4:4 format). Greater detail of foregoing process may be provided herein with reference to the various Figures.

Figure 9:
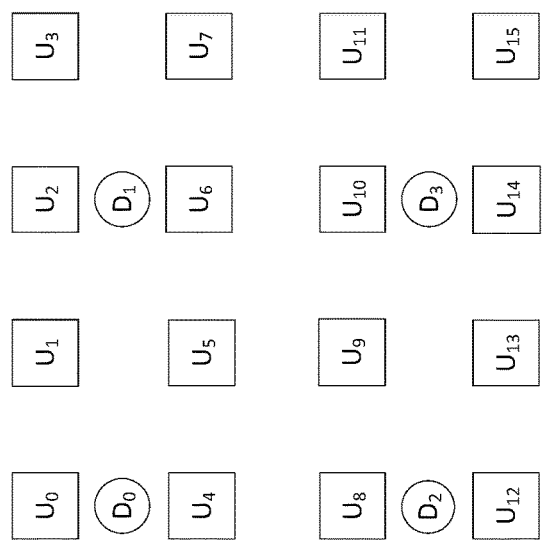
FIG. 9 shows an example sampling grid for 4:2:0 video content.

FIG. 9 shows an example 4:2:0 sampling grid. In the example, chroma samples (Cr and/or Cb samples) may occupy positions of the grid marked as "Dx," and luma samples may occupy positions of the grid marked as "Ux." The resolution of the chroma samples may be ¼ the resolution of the luma samples. The luma sampling locations and chroma sampling locations may not be aligned (e.g., as a result of chroma subsampling). Misalignment of chroma and luma sampling locations may reduce the accuracy of 2D LUT estimation. Chroma upsampling and chroma-luma phase alignment may be performed. In an example process, a plurality of existing chroma samples (e.g., Cr or Cb samples from a 4:2:0 sampling grid) may be used to derive a chroma sample value at each luma sampling location, thus aligning the chroma samples with the luma samples. For example, denoting c(Dx) as a chroma sample value (e.g., a Cb or Cr sample value) at a particular chroma sampling location Dx, and denoting the chroma sample value c'(Ux) at the luma sampling location Ux may be determined from existing chroma samples (e.g., reconstructed and/or received chroma samples) c(Dx) using a 2-tap or 4-tap filter (as shown below) based on where Ux is located (e.g., $U_4$, $U_5$, $U_8$, or $U_9$):

$$c'(U_4)=(c(D_0)*3+c(D_2)+2)/4 \quad (3)$$

$$c'(U_5)=((c(D_0)+c(D_1))*3+(c(D_2)+c(D_3))+4)/8 \quad (4)$$

$$c'(U_8)=(c(D_2)*3+c(D_0)+2)/4 \quad (5)$$

$$c'(U_9)=((c(D_2)+c(D_3))*3+(c(D_0)+c(D_1))+4)/8 \quad (6)$$

A different filter may be used for phase alignment if the relevant chroma sampling grid is different from that shown in FIG. 9. The luma sample value y and adjusted chroma c' pair (y, c') at the sample location Ux may be used as input to the 2D LUT (e.g., used for interpolation as illustrated in Equation (1)). The output of the 2D LUT may be a corrected and upsampled value of the c component at position Ux.

The nearest neighboring chroma sample value may be used in phase alignment that is performed according to the following equations:

$$c'(U_4)=c(D_0)$$

$$c'(U_5)=c(D_0)$$

$$c'(U_8)=c(D_2)$$

$$c'(U_9)=c(D_2)$$

Figure 10:
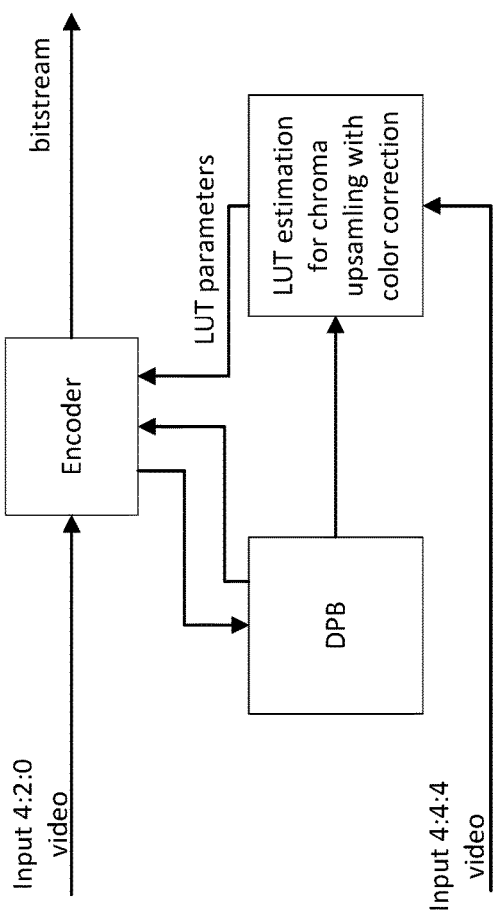
FIG. 10 shows an example diagram for conducting LUT parameter estimation for LUT-based chroma upsampling with color correction.

FIG. 10 shows an example diagram for estimating a 2D LUT at an encoder. A reconstructed picture in 4:2:0 format may be retrieved from the DPB. The reconstructed picture may include a plurality of luma and chroma samples. The chroma samples may be upsampled and/or aligned with the luma samples. The upsampled and/or aligned chroma samples, and the corresponding luma samples (e.g., which are now aligned with the chroma samples at respective sampling locations) may be used as reference values for triangle interpolation. The upsampled reconstructed picture with aligned chroma and luma values, and the original picture in 4:4:4 format (e.g., the input video signal) may be used for LUT parameter estimation. For example, the Least Square method described herein in association with 3D LUT estimation may be applied to the 2D LUT parameter estimation by using a triangle interpolation method. In an example implementation, the interpolation function $f_{P(c)}$ in equation (G) may be replaced with the triangle interpolation method described in equations (1) or (2) or the combination of equations (1) and (2). The input signal denoted as "x" in equation (G) may be replaced with the luma and chroma pair (y,c) (e.g., the chroma sample may be upsampled or phased aligned with the luma sample). The output signal denoted as "z(c)" may be replaced with the output signal of chroma component c in 4:4:4 chroma format. Other operations of the Least Square process as described in equations (H) through (P), including matrix compaction and de-compaction, stability consideration for the matrix inversion process, etc., may be performed in a manner substantially similar to the 3D LUT parameter estimation process.

The upsampling, phase alignment, and/or color correction techniques described herein may lower the complexity of the coding process and/or system. For instance, in some embodiments, the 2D LUT-based techniques may carry out two multiplication operations per LUT interpolation. Phase alignment may be comparable to 2-tap bilinear filtering in two directions, and may be implemented with bit-shifting (e.g., multiplication operations may be skipped).

Video decoding and post-processing may be performed by separate devices. For example, a decoder may decode a video signal and a display device may perform upsampling and/or additional processing after upsampling. 2D LUT-based color correction may be performed in a 4:2:0 chroma format and prior to chroma upsampling, for example to minimize changes on display devices.

Figure 11:
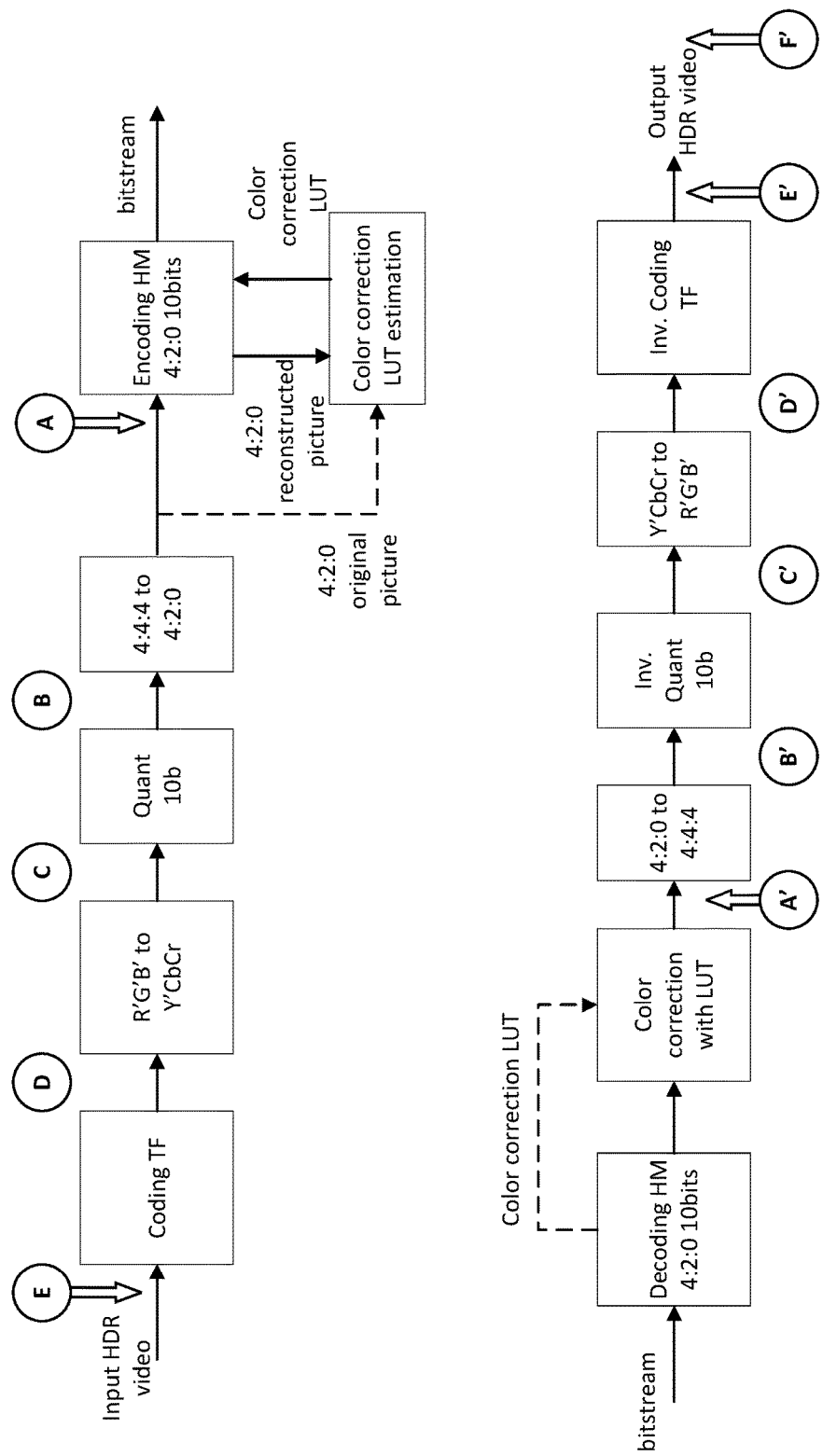
FIG. 11 shows example HDR coding and decoding operations with LUT-based color correction in a 4:2:0 format.

FIG. 11 shows an example diagram for coding and decoding a HDR signal, and applying 2D LUT-based color correction before chroma upsampling, e.g., in a 4:2:0 chroma format. Luma and chroma locations in a 4:2:0 sampling grid may be misaligned or phase-shifted (e.g., as shown in FIG. 9 and described herein), for example due to chroma subsampling. The misalignment may affect the accuracy of LUT parameter estimation and/or the effectiveness of the color correction process. Accordingly, luma samples may be derived for one or more chroma sampling locations (e.g., for every chroma sampling location) in a 4:2:0 sample grid to align the luma and chroma. The resulting luma and chroma samples may be used as references for 2D LUT estimation and/or inputs for color correction. A 2-tap bilinear interpolation filter may be used to derive the luma samples at chroma locations. For example, let y(Ux) represent a luma sample value at a luma sampling location Ux. A luma sample y(Dx) representing a luma sample value at a chroma sampling location Dx (e.g., $D_0$ as shown in FIG. 9) may be derived as follows:

$$y(D_0)=(y(U_0)+y(U_4)+1)/2 \quad (7)$$

$y(D_0)$ and $c(D_0)$ may then be used as inputs to the 2D LUT to determine a corrected value for the chroma component, where $c(D_0)$ is a chroma sample value (e.g., Cb or Cr) at position Do.

Applying color correction before upsampling may lower the complexity of the relevant processes and/or systems because the chroma resolution is lower. At the encoder side, a reconstructed picture in 4:2:0 format and the original 4:2:0 picture may be used for estimating the 2D LUT parameters. Phase alignment operations (e.g., to align luma sample locations with chroma sample locations) such as that described herein in association with Equation (7) may be applied during 2D LUT parameter estimation. As described herein, this 2D LUT parameter estimation may be performed by replacing the interpolation function $f_{P(c)}$ in equation (G) with the triangle interpolation method described in equations (1) or (2) or the combination of equations (1) and (2). The input signal denoted as "x" in equation (G) may be replaced with the luma and chroma pair (y,c) (e.g., the luma sample y may be phased aligned with the chroma sample). The output signal denoted as "z(c)" may be replaced with the output signal of chroma component c in 4:2:0 chroma format. Other operations of the Least Square process as described in equations (H) through (P), including matrix compaction and de-compaction, stability consideration for the matrix inversion process, etc., may be performed in a manner substantially similar to the 3D LUT parameter estimation process.

The 2D LUT described herein may be signaled in various ways. For example, the LUT may be signaled at a sequence level (e.g., in a Sequence Parameter Set (SPS)), at a picture level (e.g., in a Picture Parameter Set (PPS)), and/or in separate network abstraction layer (NAL) unit packets (e.g., in an Adaptive Parameter Set (APS)). The 2D LUT may be signaled in one or more out-band messages such as Supplemental Enhancement Information (SEI) messages. The 2D LUT may be shared among multiple pictures within a scene. When a scene change occurs, the 2D LUT may be updated since the characteristics of the color domain may have changed (e.g., the color characteristic may have been affected by the brightness of the scene). An encoder may decide whether the current picture should reuse a previously signaled 2D LUT or use a new 2D LUT. For example, suppose the encoder has signaled N LUTs, denoted as {Lut_0, Lut_1, . . . , Lut_N−1}. For the current picture, the encoder may generate a new LUT Lut_new based on the current reconstructed picture and the original 4:4:4 or 4:2:0 picture. The rate-distortion cost for LUT reuse and update may be calculated, for example as illustrated below:

Cost_reuse=Min(Distortion(CC(curr, Lut_i), orig)), i∈[0, N−1]

Cost_update=Distortion(CC(curr, Lut_new), orig))+ λ*Bit(Lut_new)

CC(x, y) may represent applying color correction to picture x with LUT y to generate a color corrected picture. Distortion may be calculated based on Sum of Square Error (SSE). λ may be the weight for bits, and may be related to quantization parameters used in encoding. Bits(y) may be the number of coding bits used for LUT y. Based on the calculation, the encoder may decide to reuse a LUT and send a LUT index to indicate which previous LUT may be reused for the current picture. The encoder may decide to use a new LUT and signal that LUT, for example by using a new index or overwriting one of the previously signaled LUTs.

Tables 3, 4, and 5 show example syntax and definitions that may be used for 2D LUT-based color correction and/or coding of the 2D LUT. As shown in Table 3, an indication (e.g., CC_LUT_enabled_flag) may be provided to indicate whether 2D LUT-based color correction is enabled. If such color correction is enabled, respective input/output bit depths of the luma and/or chroma components may be defined. The bit depths may indicate the maximum values of the respective luma and/or chroma components (e.g., at the input and/or output of the 2D LUT). For example, a variable input_luma_bitdepth_minus8 with a value of 0 may indicate that the input luma bitdepth is equal to 8, and that the maximum input luma value of the 2D LUT is 255. Likewise, a variable input_chroma_bitdepth_minus8 with a value of 0 may indicate that the input chroma bitdepth is equal to 8 and that the maximum input chroma value of the 2D LUT is 255. At the output, a variable output_chroma_bitdepth_minus8 with a value of 0 may indicate that the maximum output chroma value of the 2D LUT may be 255 (e.g., the output chroma value may be capped at 255). The bit depth of the luma components at the output (e.g., output_luma_bitdepth_minus8) may be optional (e.g., since the 2D LUT may output only corrected chroma values).

Additional indications regarding whether the 2D LUT is associated with the Cb component (e.g., cb_LUT_enabled_flag) or the Cr component (e.g., cr_LUT_enabled_flag) of the chroma dimension may be provided. Based on the indications, corresponding operations may be performed to code the 2D LUT (e.g., recursively via the 2D_LUT ( . . . ) function shown in Table 4). For example, the coding process may start with a first partition level of the quadtree (e.g., layer 0, which may include vertices S0-S3 shown in FIG. 5). The coding may then continue recursively through other levels (e.g., P4-P7 of FIG. 5, etc.) until an indication (e.g., split_flag) indicates that a maximum number of partitioning/split has been reached.

In an example implementation, entries of the 2D LUT (e.g., corrected chroma values associated with vertices of the quadtree-partitioned 2D color space) may be stored in and/or retrieved from a one-dimensional array (e.g., via raster scan). During coding, these entries may be retrieved from the one-dimensional array, for example via a function such as getVertex2D (comp, layer, y, x, idx). For example, for a rectangle R of the partitioned 2D color space, the input parameter "comp" may indicate the relevant chroma components (e.g., Cb or Cr) associated with the 2D LUT. The input parameters "y" and "x" may respectively indicate the luma and chroma coordinates of a first vertex of the rectangle R. For example, for vertex S0 shown in FIG. 5, the y and x values may both be 0, indicating that the vertex is at the lower left corner of the 2D color space. "layer" may indicate the relevant partition level of the quadtree to which the rectangle R may belong (e.g., the number of splits conducted to derive the rectangle R). "idx" may indicate the index of the vertex to be retrieved (e.g., idx may take a value between 0 and 3 to represent the four vertices of the rectangle R). The function getVertex2D(comp, layer, y, x, idx) in the example syntax may therefore be used to determine the position (e.g., in the one-dimensional array) of the "idx"-th vertex (e.g., which may be between 0 and 3) of the rectangle R, which may be located on the "layer"-th partition level of the quadtree. Once the position of the vertex is determined, the corresponding value at the position may be coded (e.g., via predictive coding) as described herein.

The functionality of getVertex2D( ) may be illustrated, for example using the following pseudo code:

```
getVertex2D (comp, layer, y, x, idx) {
    get dy[idx/2], dx[idx%2] using Table 5 with layer and comp;
    rect_len_y = (max_value_luma+1)>> max_layer_idx0[comp];
    rect_len_x = (max_value[comp]+1)>> max_layer_idx1[comp];
    num_vertices_comp = 1+ (1<< max_layer_idx1[comp]);
    n = ((y+(dy[idx/2]<<1))/rect_len_y)*num_vertices_comp +
        ((x+(dx[idx%2]<<1))/rect_len_x) ;
    return n;}
``` where dy and dx may indicate the respective offsets of the vertex from the first vertex (at position (y, x)). The offset values may be specified (e.g., as shown in Table 5) based on the maximum luma value (e.g., max_value_luma) and maximum chroma value (e.g., max_value[comp]), the particular partition level (or layer), and the vertex index i.

TABLE 3

Example Syntax for 2D LUT Signaling

| color_correction_LUT ( ) { | Descriptor |
|---|---|
|   CC_LUT_enabled_flag | u(1) |
|   if (CC_LUT_enabled_flag) { | |
|     input_luma_bitdepth_minus8 | ue(v) |
|     input_chroma_bitdepth_minus8 | ue(v) |
|     output_luma_bitdepth_minus8 | ue(v) |
|     output_chroma_bitdepth_minus8 | ue(v) |
|     LUT_quant_minus1 | ue(v) |
|     cb_LUT_enabled_flag | u(1) |
|     if (cb_LUT_enabled_flag) { | |
|       max_layer_idx0[0] | u(4) |
|       max_layer_idx1[0] | u(4) |
|       2D_LUT(cb, 0, 0, 0) | |
|     } | |
|     cr_LUT_enabled_flag | u(1) |
|     if (cr_LUT_enabled_flag) { | |
|       max_layer_idx0[1] | u(4) |
|       max_layer_idx1[1] | u(4) |
|       2D_LUT(cr, 0, 0, 0) | |
|     } | |
|   } | |
| } | |

TABLE 4

Example Syntax Elements for 2D_LUT( )

| 2D_LUT (comp, layer, y,x) { | Descriptor |
|---|---|
|   for( i = 0; i<4 ; i++ ) { | |
|     n = getVertex2D(comp, layer, y, x, i) | |
|     if (!coded_flag[n]) { | |
|       residual_comp | se(v) |
|       coded_flag[n] = true | |
|     } | |
|   } | |
|   if( layer < max(max_layer_idx0[comp], max_layer_idx1[comp]) ) { | |
|     split_flag | u(1) |
|     if ( split_flag ) { | |
|       for( j = 0; j< (layer < max_layer_idx0[comp]? 2:1) ; j++ ) { | |
|         for( i = 0; i< (layer < max_layer_idx1[comp]? 2:1) ; i++ ) { | |
|           2D_LUT ( comp, layer+1, y+dy[j], x+dx[i]) | |
|         } | |
|       } | |
|     } | |
|   } | |
| } | |

TABLE 5

Definitions of dy, dx

| i | dy[i] | dx[i] |
|---|---|---|
| 0 | 0 | 0 |
| 1 | (max_value_luma + 1) >> (1 + layer) | (max_value[comp] + 1) >> (1 + layer) |

The variables used in the example syntax may be explained as follows. A variable (e.g., CC_LUT_enabled_flag) may be signaled in the bitstream to indicate whether color correction with LUT is enabled. A decoder may carry out different operations based on the value of this variable. For example, if the decoder determines, based on the variable, that color correction is not enabled, the decoder may skip operations associated with LUT-based color correction (e.g., since the LUT may not be signaled). If the decoder determines, based on the variable, that color correction is enabled, the decoder may perform operations associated with LUT-based color correction (e.g., extracting the LUT and applying it at one or more sample positions).

A variable (e.g., input_luma_bitdepth_minus8) may be signaled to specify the luma bit depth of the input signal. One or more other variables may be derived based on this variable (e.g., input_luma_bitdepth may be calculated as (input_luma_bitdepth_minus8+8)). Another variable (e.g., input_chroma_bitdepth_minus8) may be signaled to specify the chroma bit depth of the input signal. One or more other variables may be derived based on this variable (e.g., input_chroma_bitdepth may be calculated as (input_chroma_bitdepth_minus8+8)).

A variable (e.g., output_luma_bitdepth_minus8) may be signaled to specify the luma bit depth of the output signal. One or more other variables may be derived based on this variable (e.g., output_luma_bitdepth may be calculated as (output_luma_bitdepth_minus8+8)). A variable (e.g., output_chroma_bitdepth_minus8) may be signaled to specify the chroma bit depth of the output signal. One or more other variables may be derived based on this variable (e.g., output_chroma_bitdepth may be calculated as (output_chroma_bitdepth_minus8+8)).

A variable (e.g., LUT_quant_minus1) may be signaled to specify the quantization step size for the residual signal. A reconstructed LUT' may be calculated as LUT'=pred+residual_comp*(LUT_quant_minus1+1), where pred may represent prediction values derived from a parent rectangle and where residual_comp may represent coded residual values.

A variable (e.g., cb_LUT_enabled_flag) may be signaled to indicate whether color correction is enabled for the Cb component. If color correction for Cb is not enabled, a LUT for the Cb component may not be signaled and relevant processing may be skipped. max_layer_idx0[0] may specify the maximum number of luma component layers in quadtree for a LUT for the Cb component. max_layer_idx1[0] may specify the maximum number of Cb layers in quadtree for a LUT for the Cb component.

A variable (e.g., cr_LUT_enabled_flag) may be signaled to indicate whether color correction is enabled for the Cr component. If color correction for Cr is not enabled, a LUT for the Cr component may not be signaled and relevant processing may be skipped. max_layer_idx0[1] may specify the maximum number of luma component layers in quadtree for a LUT for the Cr component. max_layer_idx1[1] may specify the maximum number of Cr layers in quadtree for a LUT for the Cr component.

A variable (e.g., residual_comp) may be signaled to specify coded residual values at the vertices, and may be used for LUT reconstruction. A variable (e.g., split_flag) may indicate whether the quadtree at the current layer may be split. If split_flag is 1, the current layer may be splitted further. For instance, the current layer may be splitted in one dimension or in two dimensions. If the current layer number is smaller than the maximum number of layers for a dimension, the current layer may be splitted in that dimension. Otherwise, the current layer may not be splitted in that dimension. If split_flag is 0, the current layer may not be splitted.

Predictive coding may be used to code the LUT value defined at each vertex. For example, to code the LUT value at P0 of rectangle (P0, P1, P2, P3) shown in FIG. 5, a parent rectangle (e.g., a rectangle encompassing the rectangle (P0, P1, P2, P3) represented by the quadtree structure (S0, S1, S2, S3)) may be used to predict LUT value at P0 (e.g., since the structure includes P0 and the LUT values at S0, S1, S2, S3 may have already been signaled). Let LUT' represent a reconstructed LUT, bilinear interpolation may be used to derive the prediction values of P0, P4, P5, P6, P7 as follows:

$$\mathrm{Pred}(P0)=(\mathrm{LUT}'(S0)+\mathrm{LUT}'(S1)+\mathrm{LUT}'(S2)+\mathrm{LUT}'(S3)+2)/4 \quad (3)$$

$$\mathrm{Pred}(P4)=(\mathrm{LUT}'(S0)+\mathrm{LUT}'(S1)+1)/2 \quad (4)$$

$$\mathrm{Pred}(P5)=(\mathrm{LUT}'(S1)+\mathrm{LUT}'(S2)+1)/2 \quad (5)$$

$$\mathrm{Pred}(P6)=(\mathrm{LUT}'(S2)+\mathrm{LUT}'(S3)+1)/2 \quad (6)$$

$$\mathrm{Pred}(P7)=(\mathrm{LUT}'(S0)+\mathrm{LUT}'(S3)+1)/2 \quad (7)$$

The prediction residual (e.g., difference) between the LUT value at P0 and Pred(P0) may be coded and signaled in the bitstream.

Figure 12A:
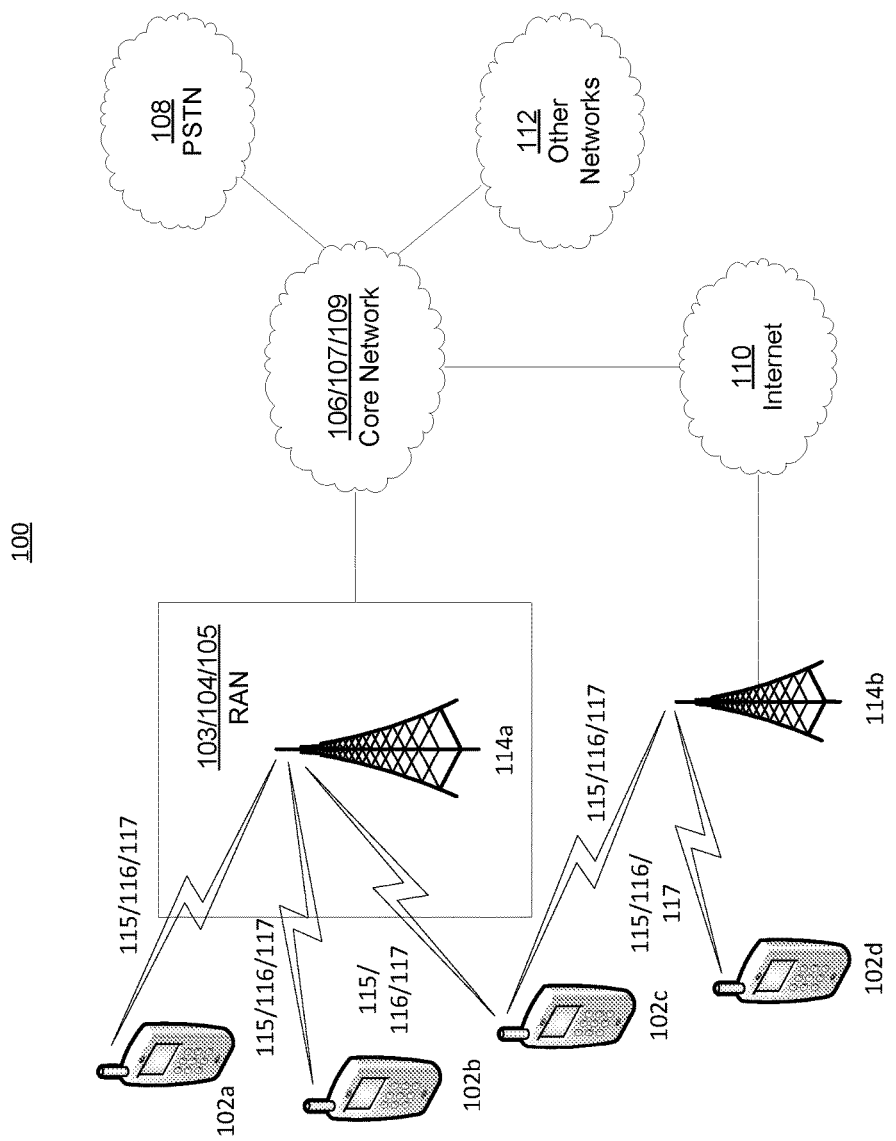
FIG. 12A depicts a diagram of an example communications system in which one or more disclosed embodiments may be implemented.

FIG. 12A depicts a diagram of an example communications system 100 in which one or more disclosed embodiments may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 12A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 12A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 12A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 12A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Figure 12B:
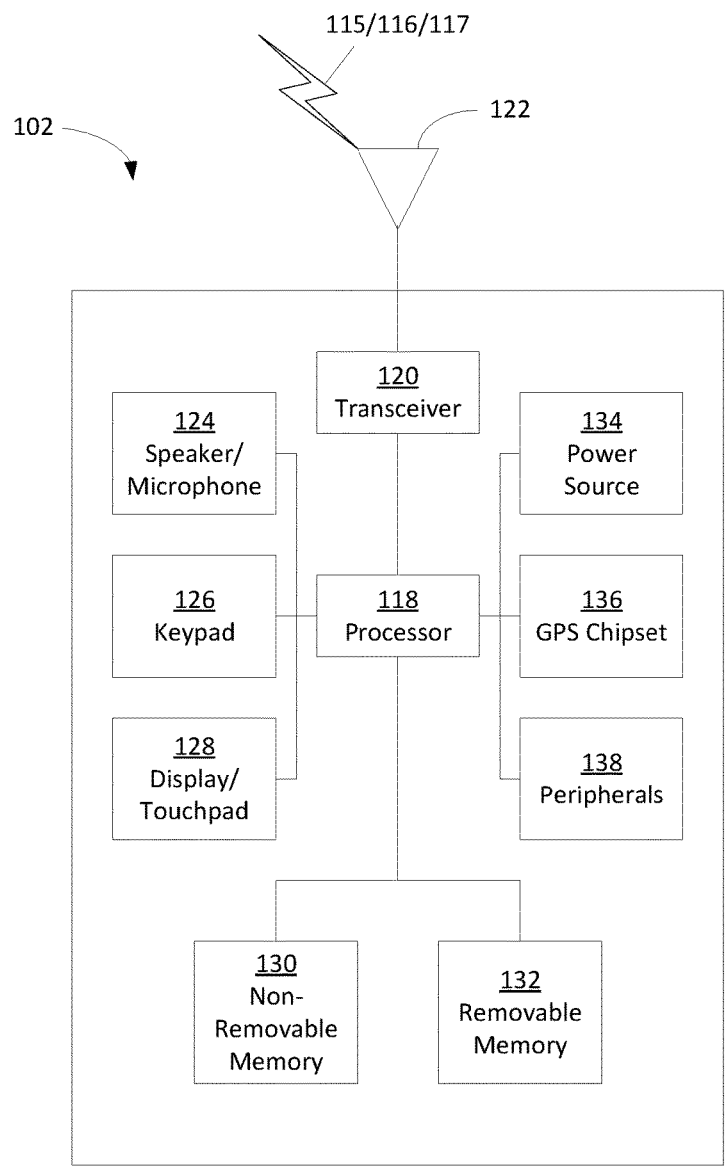
FIG. 12B depicts a system diagram of an example wireless transmit/receive unit (WTRU) that may be used within the communications system illustrated in FIG. 12A.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 12A may be configured to communicate with the base station 114a, which may employ a cellular-based radio technology, and with the base station 114b, which may employ an IEEE 802 radio technology. FIG. 12B depicts a system diagram of an example WTRU 102. As shown in FIG. 12B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 12B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 12B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 12B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example. The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12C:
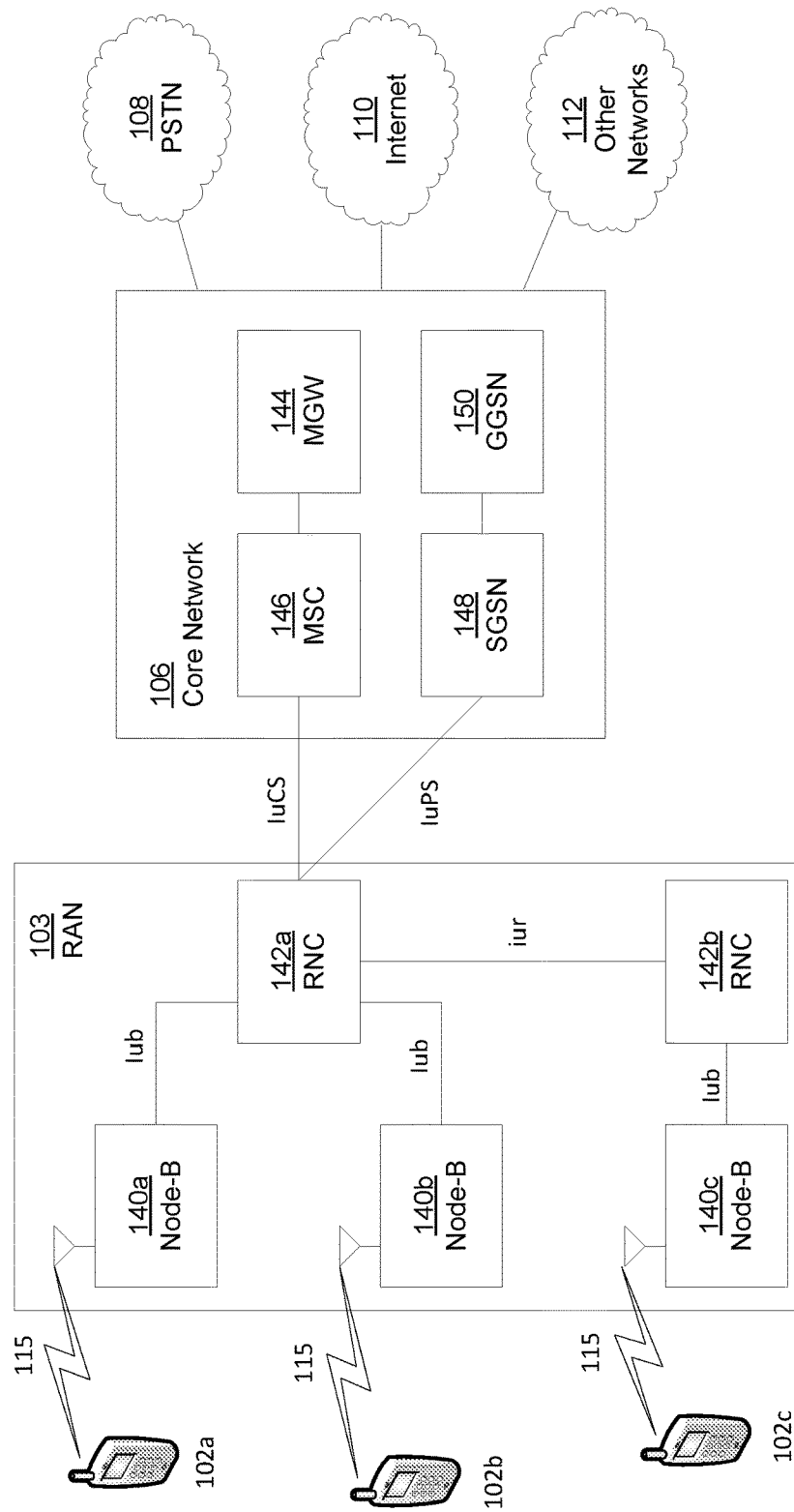
FIG. 12C depicts a system diagram of an example radio access network and an example core network that may be used within the communications system illustrated in FIG. 12A.

FIG. 12C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 12C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 12C, the Node-Bs 140a and/or 140b may be in communication with the RNC 142a. Additionally, the Node-B 140c may be in communication with the RNC142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 12C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 12D:
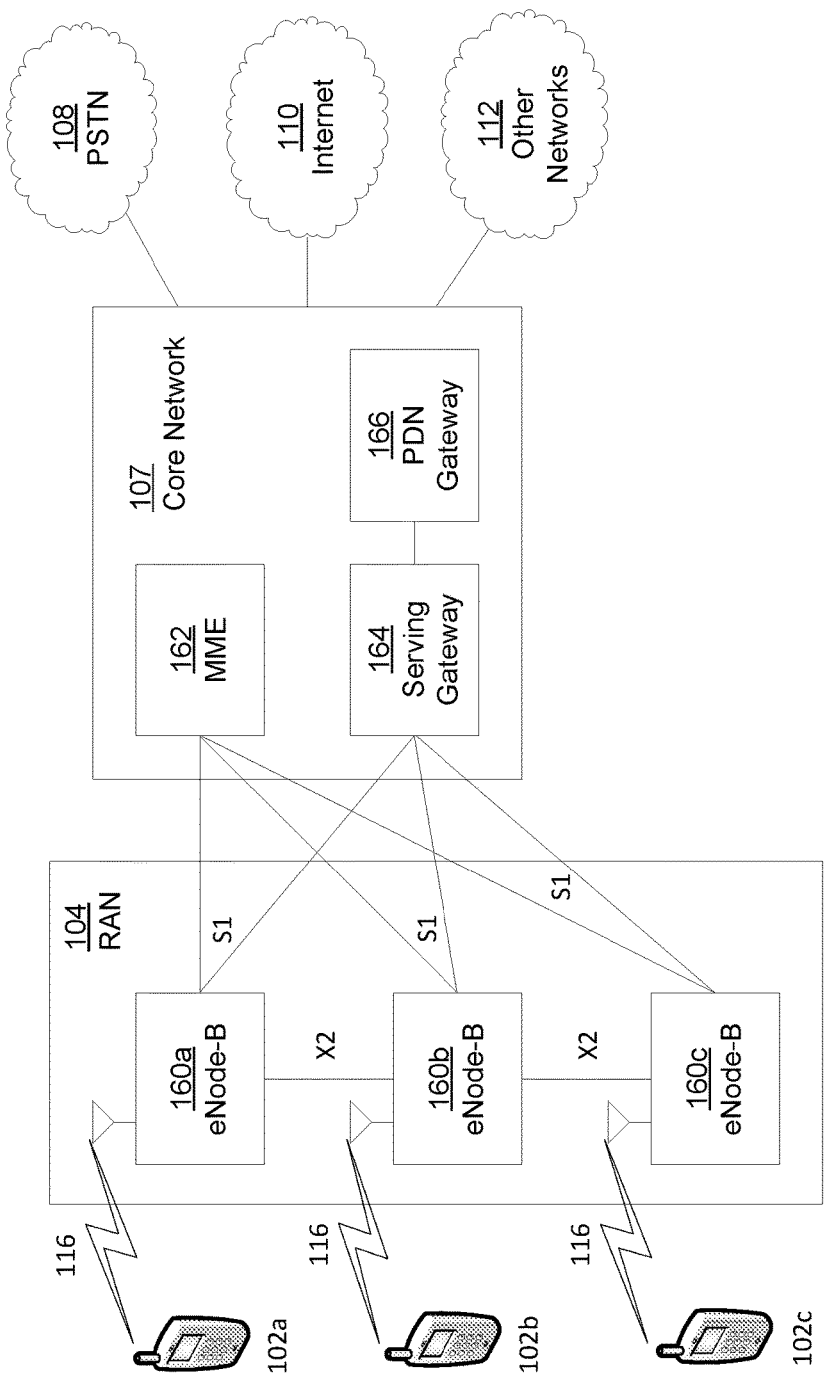
FIG. 12D depicts a system diagram of another example radio access network and an example core network that may be used within the communications system illustrated in FIG. 12A.

FIG. 12D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 12D, the eNode-Bs 160a, 160b, and/or 160c may communicate with one another over an X2 interface.

The core network 107 shown in FIG. 12D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 12E:
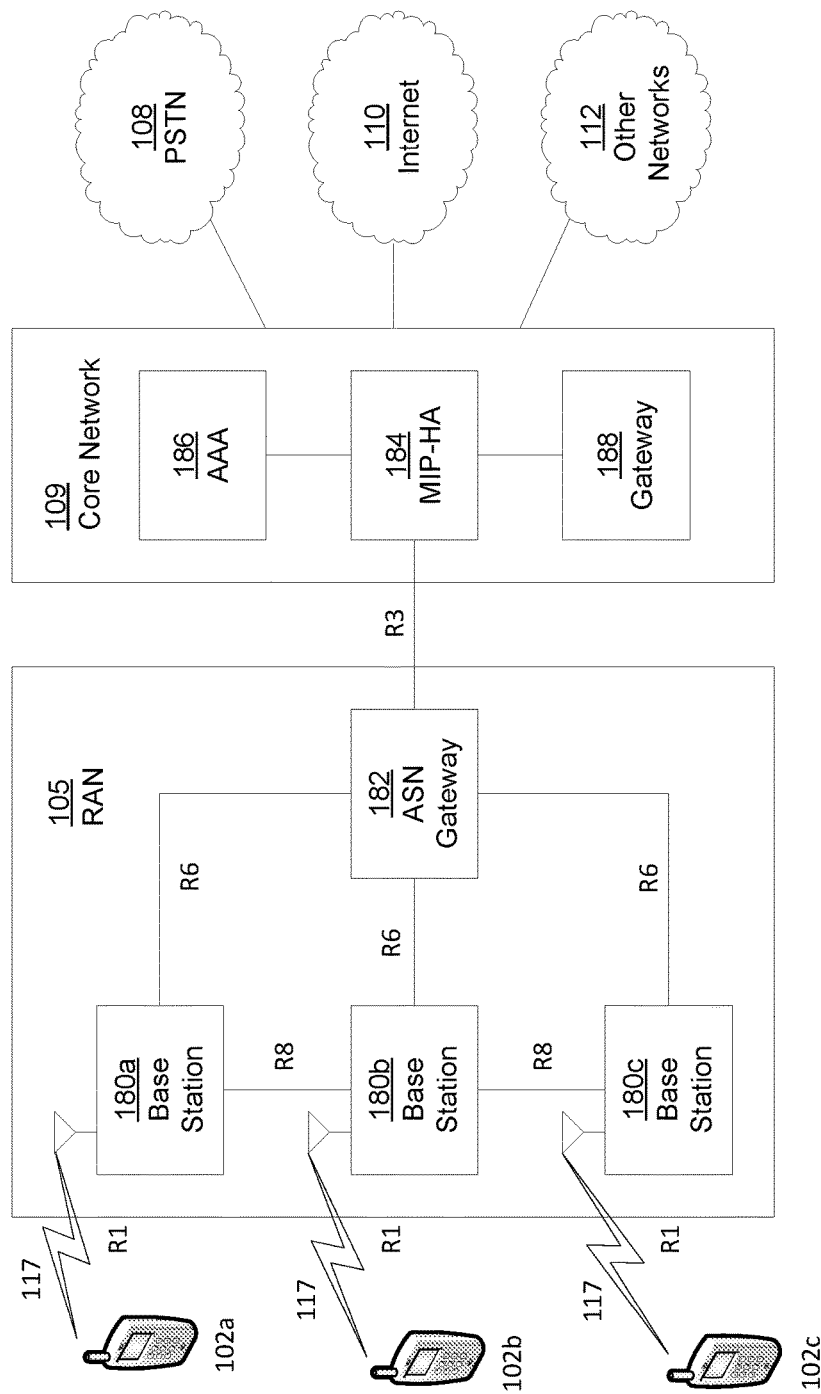
FIG. 12E depicts a system diagram of another example radio access network and an example core network that may be used within the communications system illustrated in FIG. 12A.

FIG. 12E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 12E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 12E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 12E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for processing video content, the method comprising:
   receiving a first luma sample, a first chroma sample, and a two-dimensional (2D) look-up table (LUT) for producing corrected chroma values, wherein the 2D LUT defines a luma dimension and a chroma dimension associated with a 2D color space of the video content, the 2D color space is defined by a plurality of rectangular units with respective vertices, and the 2D LUT comprises corrected chroma component values associated with the respective vertices of the rectangular units;
   determining an input luma value and an input chroma value to the 2D LUT via an upsampling operation utilizing at least one of the first luma sample or the first chroma sample, wherein the first luma sample and the first chroma sample are associated with different sampling locations, and the input luma value and the input chroma value are aligned to a same sampling location;
   producing an output chroma value based on the 2D LUT, the input chroma value and the input luma value; and
   reconstructing the video content using at least the output chroma value.

2. The method of claim 1, wherein the plurality of rectangular units of the 2D color space are derived using quadtree partitioning.

3. The method of claim 1, wherein the producing of the output chroma value comprises:
   determining a first rectangular unit among the plurality of rectangular units to which the input luma value and the input chroma value belong; and
   calculating the output chroma value via triangle interpolation based on a subset of the chroma component values associated with the vertices of the first rectangular unit, the input chroma value, and the input luma value.

4. The method of claim 3, wherein the calculating of the output chroma value via triangle interpolation comprises:
   determining a first triangle inside the first rectangular unit to which the input luma value and the input chroma value belong; and
   applying triangle interpolation based on the chroma component values associated with the vertices of the first triangle, the input chroma value, and the input luma value.

5. The method of claim 3, wherein the calculating of the output chroma value via triangle interpolation comprises applying triangle interpolation based on the chroma component values associated with three vertices of the first rectangular unit, the input chroma value, and the input luma value.

6. The method of claim 1, further comprising receiving a second luma sample, wherein the input chroma value is set to the first chroma sample, and wherein the input luma value is determined by interpolating at least the first luma sample and the second luma sample.

7. The method of claim 1, further comprising receiving a second chroma sample, wherein the input luma value is set to the first luma sample, and wherein the input chroma value is determined by interpolating at least the first chroma sample and the second chroma sample.

8. A device for processing video content, the device comprising:
a processor configured to:
receive a first luma sample, a first chroma sample, and a two-dimensional (2D) look-up table (LUT) for producing corrected chroma values, wherein the 2D LUT defines a luma dimension and a chroma dimension both of which are associated with a 2D color space of the video content, the 2D color space of the video content is defined by a plurality of rectangular units with respective vertices, and the 2D LUT comprises corrected chroma component values associated with the respective vertices of the rectangular units;
determine an input luma value and an input chroma value to the 2D LUT via an upsampling operation utilizing at least one of the first luma sample or the first chroma sample, wherein the first luma sample and the first chroma sample are associated with different sampling locations, and the input luma value and the input chroma value are aligned to a same sampling location;
produce an output chroma value based on the 2D LUT, the input chroma value and the input luma value; and
reconstruct the video content using at least the output chroma value.

9. The device of claim 8, wherein the plurality of rectangular units of the 2D color space are derived using quadtree partitioning.

10. The device of claim 8, wherein the processor being configured to produce the output chroma value comprises the processor being configured to:
determine a first rectangular unit among the plurality of rectangular units to which the input luma value and the input chroma value belong; and
calculate the output chroma value via triangle interpolation based on a subset of the chroma component values associated with the vertices of the first rectangular unit, the input chroma value, and the input luma value.

11. The device of claim 10, wherein the processor being configured to calculate the output chroma value via triangle interpolation comprises the processor being configured to:
determine a first triangle inside the first rectangular unit to which the input luma value and the input chroma value belong; and
apply triangle interpolation based on the chroma component values associated with the vertices of the first triangle, the input chroma value, and the input luma value.

12. The device of claim 10, wherein the processor being configured to calculate the output chroma value via triangle interpolation comprises the processor being configured to apply triangle interpolation based on the chroma component values associated with three vertices of the first rectangular unit, the input chroma value, and the input luma value.

13. The device of claim 8, wherein the processor is configured to receive a second luma sample, to set the input chroma value to the first chroma sample, and to determine the input luma value by interpolating at least the first luma sample and the second luma sample.

14. The device of claim 8, wherein the processor is configured to receive a second chroma sample, to set the input luma value to the first luma sample, and to determine the input chroma value by interpolating at least the first chroma sample and the second chroma sample.

15. A method for processing video content, the method comprising:
partitioning a two-dimensional (2D) color space associated with the video content into a plurality of rectangular units with respective vertices, wherein the 2D color space comprises a luma dimension and a chroma dimension;
determining a chroma sample value and a luma sample value for estimating a 2D look-up table (LUT) associated with the 2D color space, wherein both the chroma sample value and the luma sample value are aligned to a first sampling location, and wherein the 2D LUT comprises a plurality of chroma component values associated with the vertices of the 2D color space;
determining a corrected chroma value associated with one of the vertices of the 2D color space based on the chroma sample value, the luma sample value, and an original version of the video content;
setting one of the chroma component values in the 2D LUT to the corrected chroma value; and
coding the 2D LUT in a video bitstream associated with the video content.

16. The method of claim 15, wherein the 2D color space is partitioned using quadtree partitioning.

* * * * *